US012780693B1

(12) United States Patent
Song et al.

(10) Patent No.: US 12,780,693 B1
(45) Date of Patent: Nov. 3, 2026

(54) FILTERING DEVICE AND CONTAINER WASHING MACHINE

(71) Applicant: GUANGZHOU QINGKUAI INNOVATION TECHNOLOGY CO., LTD., Guangzhou (CN)

(72) Inventors: Qifeng Song, Guangzhou (CN); Huiqi He, Guangzhou (CN); Weixiong He, Guangzhou (CN); Zhikun Kang, Guangzhou (CN); Qing Guo, Guangzhou (CN); Shengke Wu, Guangzhou (CN)

(73) Assignee: GUANGZHOU QINGKUAI INNOVATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/537,925

(22) Filed: Feb. 12, 2026

(30) Foreign Application Priority Data

Aug. 18, 2025 (CN) ......................... 202521763750.4
Nov. 18, 2025 (CN) ......................... 202522453872.X

(51) Int. Cl.

| | |
|---|---|
| ***C02F 1/42*** | (2023.01) |
| ***A47L 15/00*** | (2006.01) |
| ***A47L 15/42*** | (2006.01) |
| ***C02F 1/44*** | (2023.01) |
| *C02F 101/10* | (2006.01) |

(52) U.S. Cl.
CPC ............ *C02F 1/42* (2013.01); *A47L 15/0065* (2013.01); *A47L 15/4202* (2013.01); *A47L 15/4214* (2013.01); *C02F 1/44* (2013.01); *C02F 2001/425* (2013.01); *C02F 2101/10* (2013.01); *C02F 2307/12* (2013.01)

(58) Field of Classification Search
CPC ......................................................... C02F 1/42
See application file for complete search history.

(56) References Cited

U.S. PATENT DOCUMENTS

2001/0010296 A1* 8/2001 Hirota ................. C02F 1/46104
210/243

* cited by examiner

*Primary Examiner* — Jason Y Ko
(74) *Attorney, Agent, or Firm* — HOWARD M COHN and Associates, LLC

(57) ABSTRACT

A filtering device and a container washing machine with an external water tank are provided. The container washing machine includes a washing main body, the filtering device, and at least one rack configured to accommodate containers. The filtering device includes a first water tank directly or indirectly connected to a filtering component. The filtering component is configured to filter calcium and magnesium ions in water and convey filtered water to the first water tank. The first water tank is disposed outside the washing main body and is connected to a water inlet driving device via a connecting assembly. The water inlet driving device is configured to convey water from the first water tank into the washing main body. A drainage driving device is configured to discharge used water from the washing device outside the washing main body.

16 Claims, 18 Drawing Sheets

FILTERING DEVICE AND CONTAINER WASHING MACHINE

TECHNICAL FIELD

The present disclosure relates to a field of container cleaning technology, and in particular to a filtering device and a container washing machine.

BACKGROUND

Containers, such as baby bottles, are commonly used to hold milk or drinking water. A baby bottle generally consists of two main parts: the bottle body and the nipple. Tools for cleaning baby bottles comprise handheld cleaners or brushes, as well as bottle washing machines.

There are two ways to introduce washing liquid into conventional container washing machines, such as the bottle washing machines. In a first way, a container washing machine is directly connected to tap water, which causes limescale buildup inside the container washing machine, affecting cleaning performance and shortening its lifespan. In a second way, the cleaning machine has a built-in water tank, and washing liquid such as tap water, purified water, or mineral water must be manually added. The container cleaning machine with the built-in water tanks may leave water stains or mineral deposits inside the machine after prolonged use.

SUMMARY

Embodiments of the present disclosure provide a filtering device. The filtering device comprises a first water tank, a second water tank, a filtering component, a delivery pipe, and a connector.

The delivery pipe is connected to and communicated with the connector. The first water tank is detachably connected to the second water tank. At least a portion of the second water tank is disposed within the first water tank. The filtering component is connected to at least one of the first water tank and the second water tank. The filtering component is configured to filter calcium and magnesium ions in water from the second water tank and is configured to convey filtered water into the first water tank. At least a portion of the delivery pipe is disposed within the first water tank, and at least a portion of the connector is disposed outside the first water tank.

The first water tank comprises a bottom wall and side walls. The side walls of the first water tank are connected around the bottom wall to define a water tank cavity and a water inlet. The water tank cavity is communicated with the water inlet. The connector is disposed at a position away from the bottom wall of the first water tank and close to the water inlet of the first water tank.

The present disclosure further provides a container washing machine having an external water tank. The container washing machine comprises a washing main body, the water tank, and a delivery pipe. The washing main body comprises a housing assembly, a washing device, a water inlet driving device, a drainage driving device, and at least one rack disposed in the housing assembly. The at least one rack is configured to place containers. The water tank is disposed outside the washing main body and is configured to store water. The water tank is connected to the water inlet driving device through the delivery pipe. A water outlet portion of the delivery pipe is disposed at an upper portion of the water tank or above the water tank. The water inlet driving device is configured to drive water in the water tank into the washing main body. The washing device is configured to wash the containers placed on the at least one rack by using the water from the water tank. The drainage driving device is configured to discharge used water in the washing main body out of the washing main body.

The filtering device is configured to filter water, and the water filtered by the filtering device is conveyed to the washing main body through the connecting assembly. The washing main body is configured to accommodate containers such as baby bottles, and the washing main body is capable of driving the water filtered by the filtering device to wash the containers placed in the washing main body. Since the filtering device filters the water in advance, the washing main body uses the water filtered by the filtering device to wash the containers placed in the washing main body, which prevents water stains and minerals from remaining in the washing main body and prevents scale from being generated in the washing main body. Further, it improves the efficiency of the washing main body in cleaning containers and extends the service life of the washing main body.

In the embodiments of the present disclosure, the connector is disposed at the position away from the bottom wall of the first water tank. For example, the connector is disposed above the side walls of the first water tank. Therefore, there is no need to provide a water hole on the bottom wall of the first water tank, and there is no need to provide a waterproof structure at the bottom wall of the first water tank, which saves waterproof structure components to a certain extent and effectively solves a problem of water leakage of the filtering device.

BRIEF DESCRIPTION OF DRAWINGS

To gain a more complete understanding of the present disclosure and its technical effects, the following description is provided in conjunction with the accompanying drawings, where the same reference numerals in the following description denote the same parts.

DETAILED DESCRIPTION

As shown in FIGS. 1-4, one embodiment of the present disclosure provides a container washing machine **10*d* having an external water tank, which is briefly referred to as the container washing machine 10*d*. The container washing machine 10*d* is capable of washing containers such as baby bottles and cups. The container washing machine 10*d* comprises a washing main body 5000 and a filtering device 6000. In some embodiments, the filtering device 6000 comprises at least one external water tank. The filtering device 6000 is capable of receiving water, such as tap water, and the filtering device 6000 is capable of filtering the water after receiving it. The filtering device 6000 and the washing main body 5000 are connected to and communicated with each other through a connecting assembly 7000. The water filtered by the filtering device 6000 is conveyed to the washing main body 5000 through the connecting assembly 7000. The washing main body 5000 is configured to accommodate containers such as baby bottles, and the washing main body 5000 is configured to drive the water filtered by the filtering device 6000 to wash the containers loaded in the washing main body 5000. Since the filtering device 6000 filters the water in advance, the washing main body 5000 uses the water filtered by the filtering device 6000 to wash the containers loaded in the washing main body 5000, which prevents water stains and minerals from remaining in the washing main body 5000 and prevents scale from being generated in the washing main body 5000. Therefore, the present disclosure improves efficiency of the washing main body 5000 in cleaning the containers and extends the service life of the washing main body 5000**.

In one embodiment, the washing main body 5000 and the filtering device 6000 are detachably connected through the connecting assembly 7000. Thus, when the washing main body 5000 and the filtering device 6000 are in a separated state, the washing main body 5000 and the filtering device 6000 are allowed to be used independently. In one case, the washing main body 5000 directly receives a water source such as purified water. In another case, the filtering device 6000 is applied to other devices such as a dishwasher. The following is a description of the filtering device 6000 in conjunction with schematic diagrams of the filtering device 6000.

Figure 5:
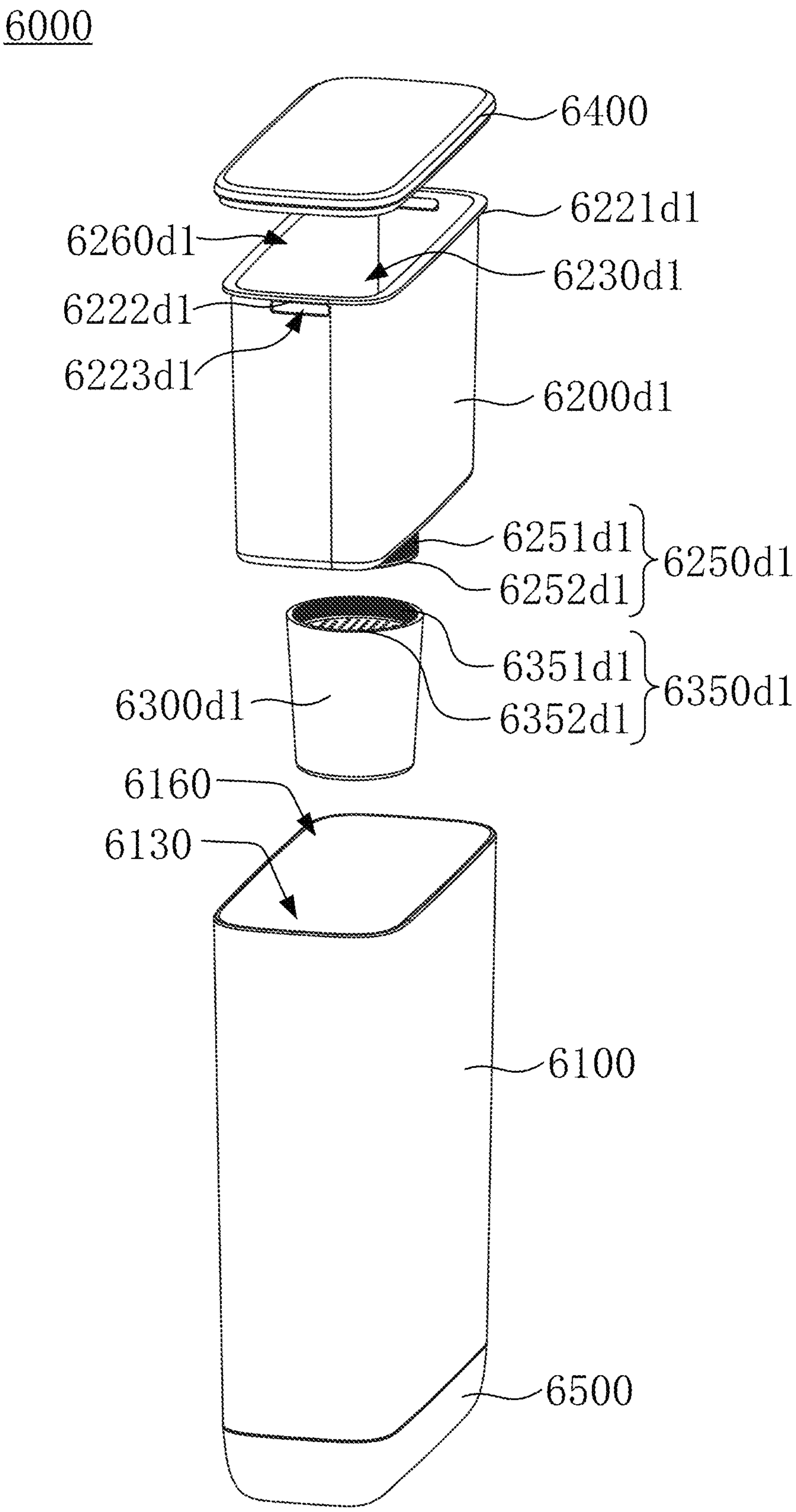
FIG. 5 is an exploded schematic diagram of an external water tank of the container washing machine according to one optional embodiment of the present disclosure.
Figure 6:
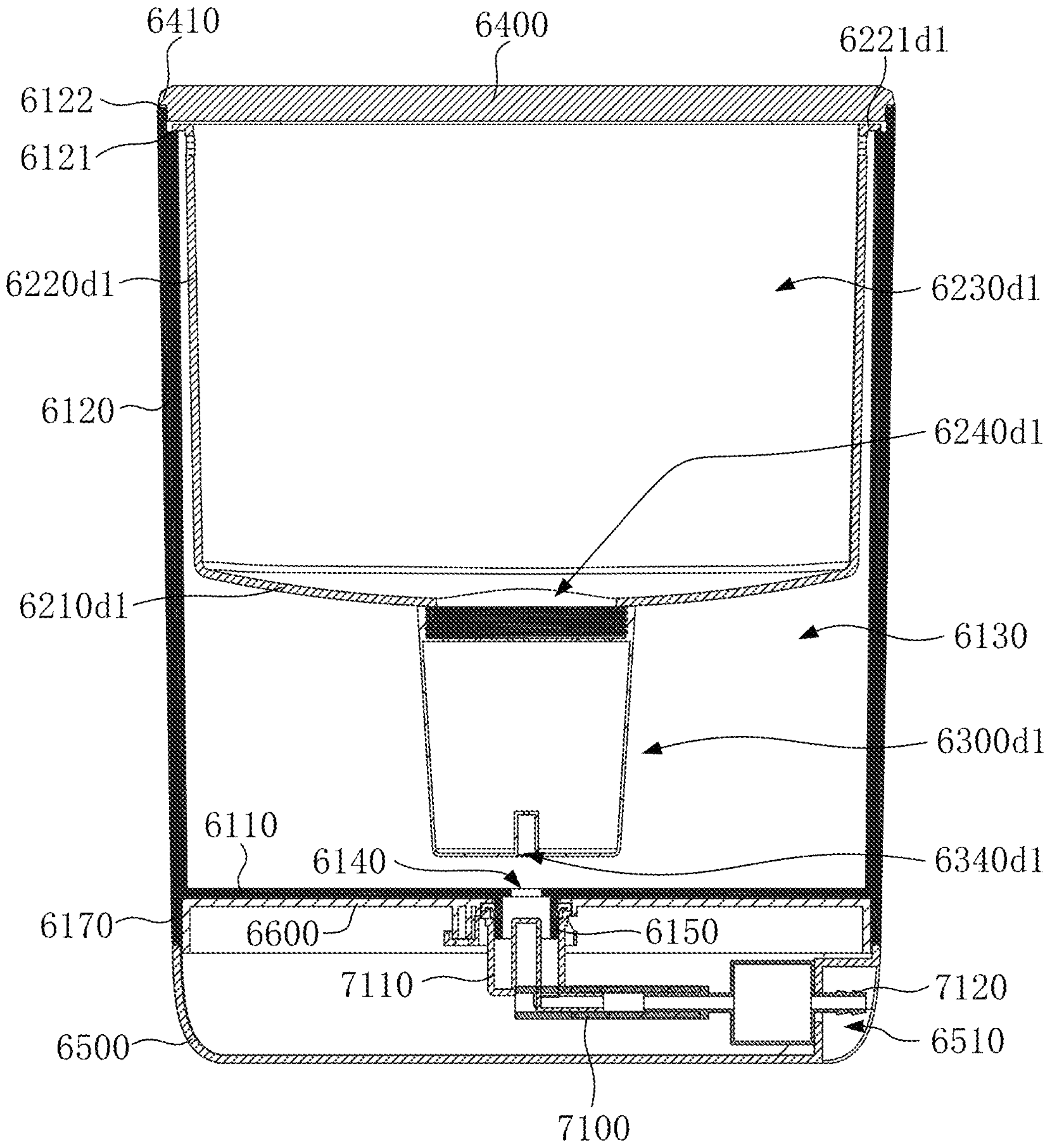
FIG. 6 is a cross-sectional schematic diagram of the external water tank of the container washing machine according to one optional embodiment of the present disclosure.
Figure 7:
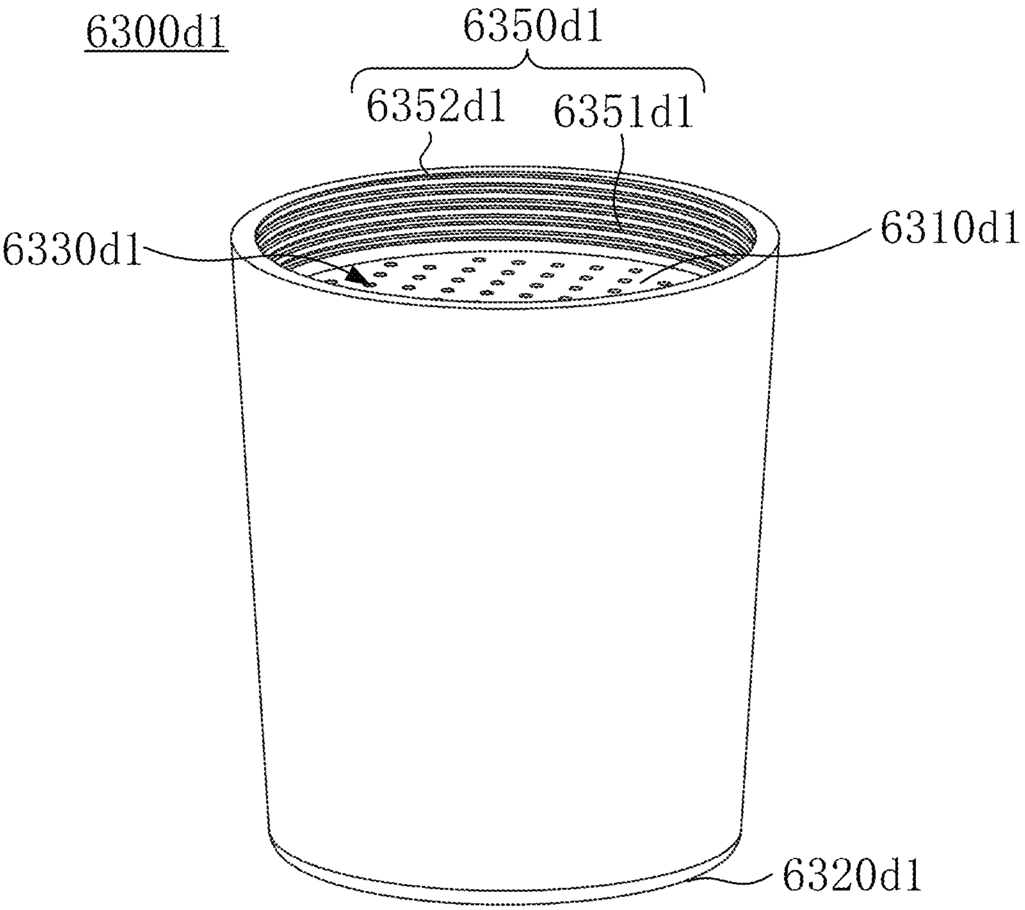
FIG. 7 is a schematic diagram of a filtering component of the external water tank of the container washing machine according to one optional embodiment of the present disclosure.
Figure 8:
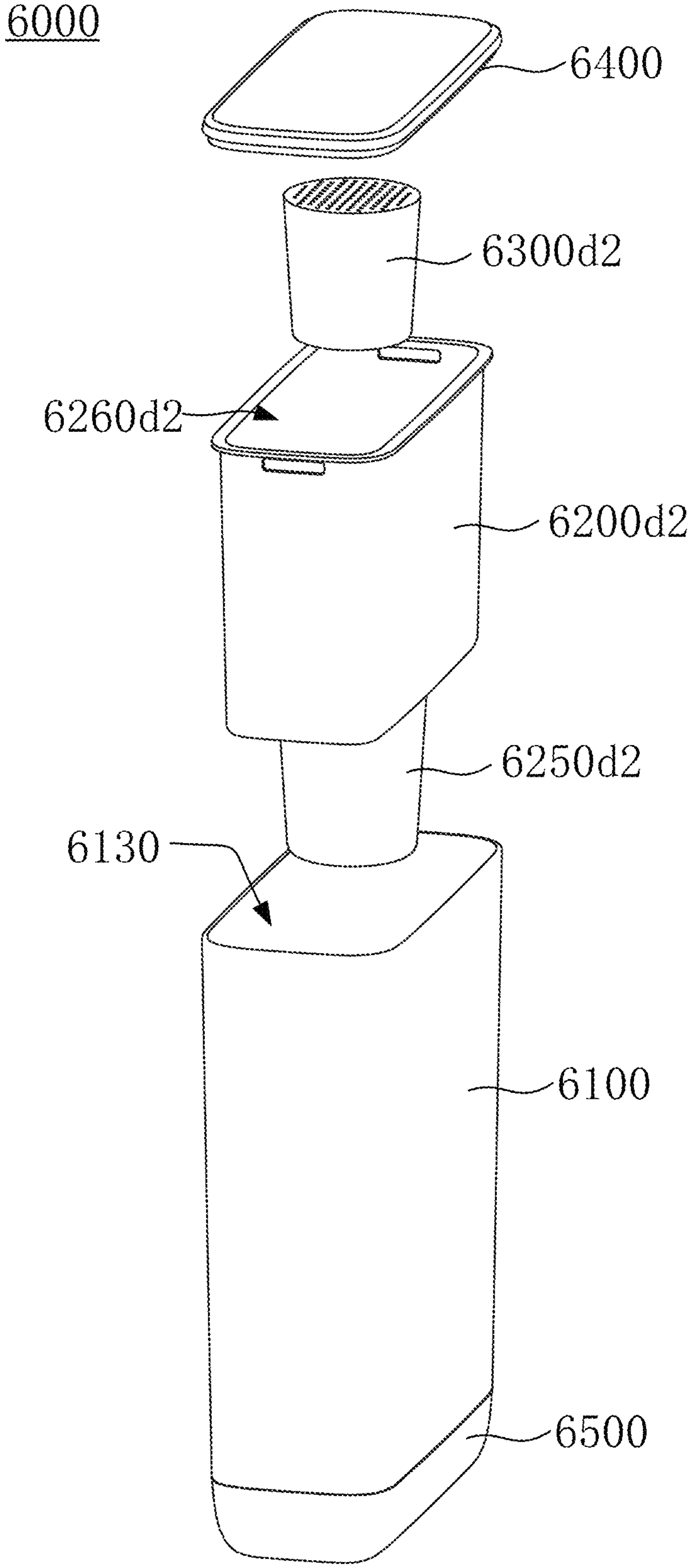
FIG. 8 is another exploded schematic diagram of the external water tank of the container washing machine according to one optional embodiment of the present disclosure.
Figure 9:
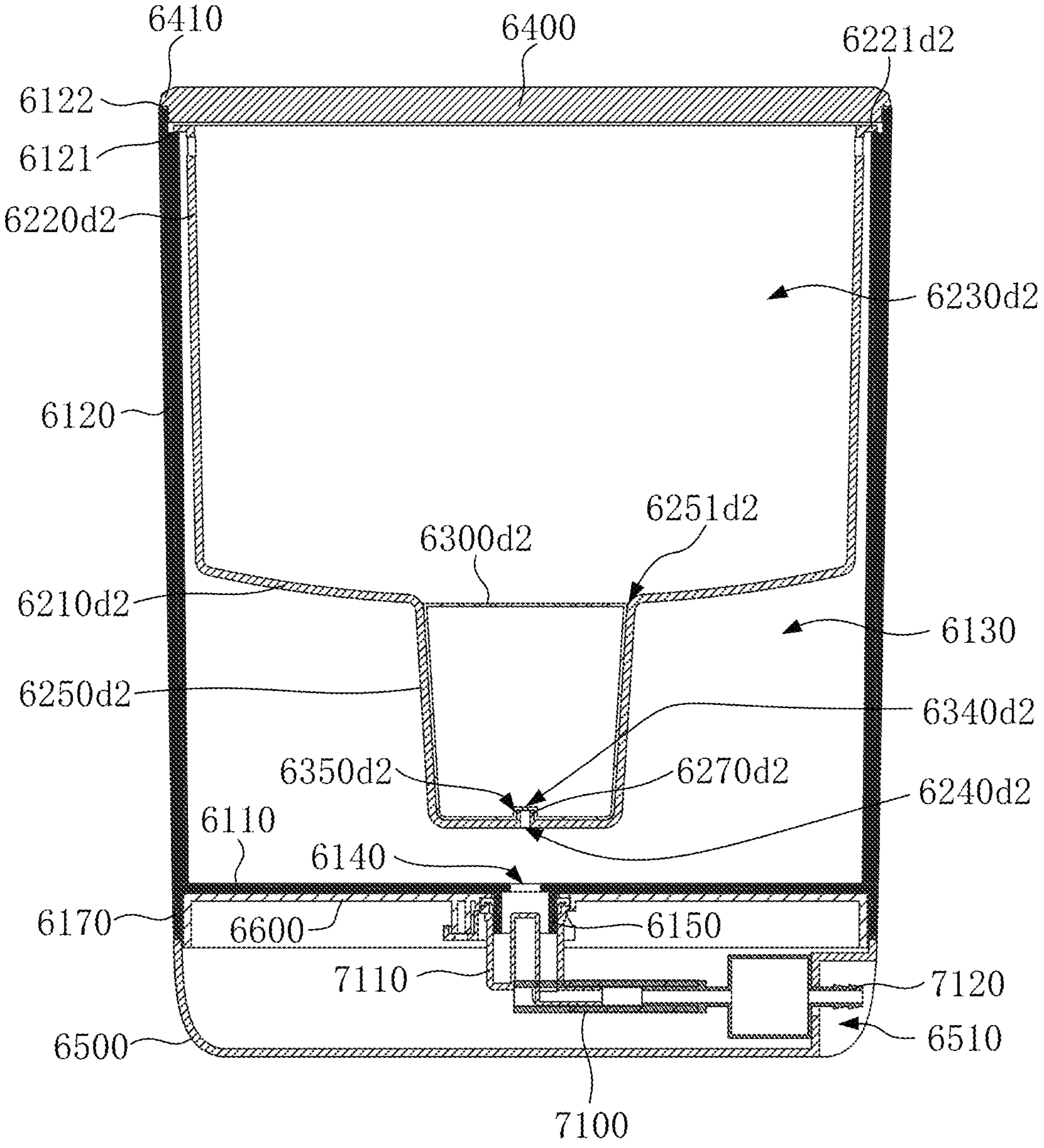
FIG. 9 is another cross-sectional schematic diagram of the external water tank of the container washing machine according to one optional embodiment of the present disclosure.
Figure 10:
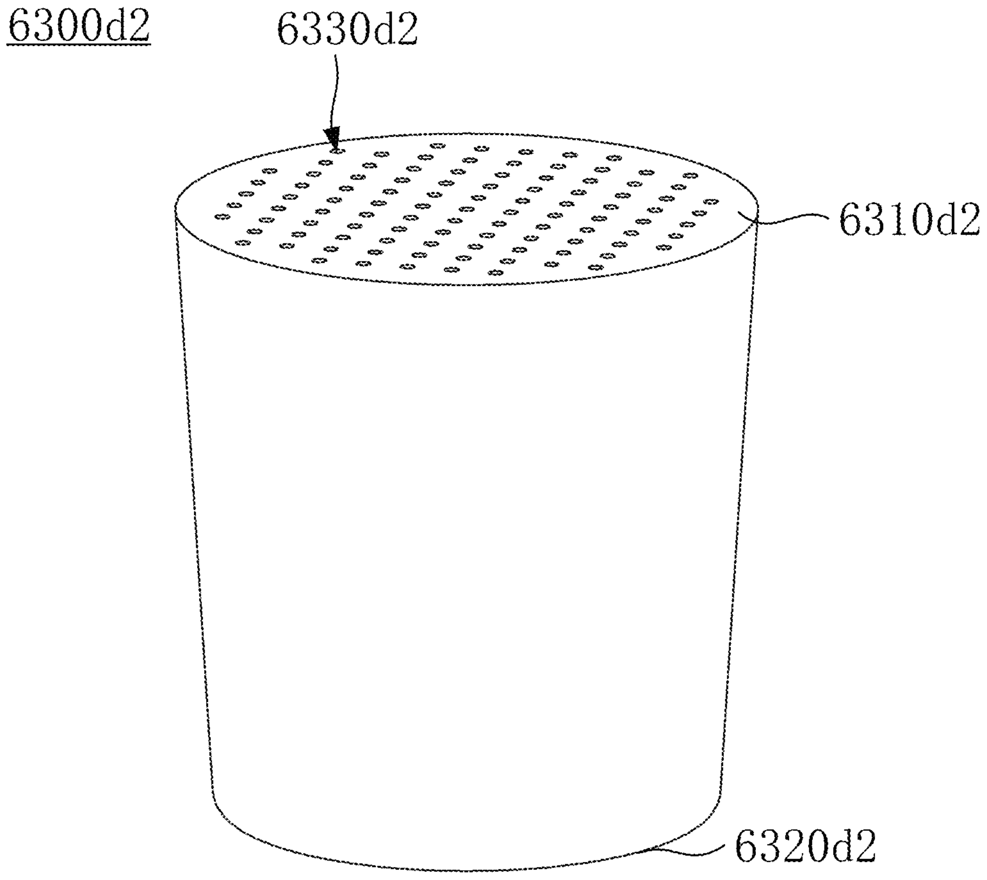
FIG. 10 is a schematic diagram of the filtering component of the external water tank of the container washing machine according to one optional embodiment of the present disclosure.
Figure 11:
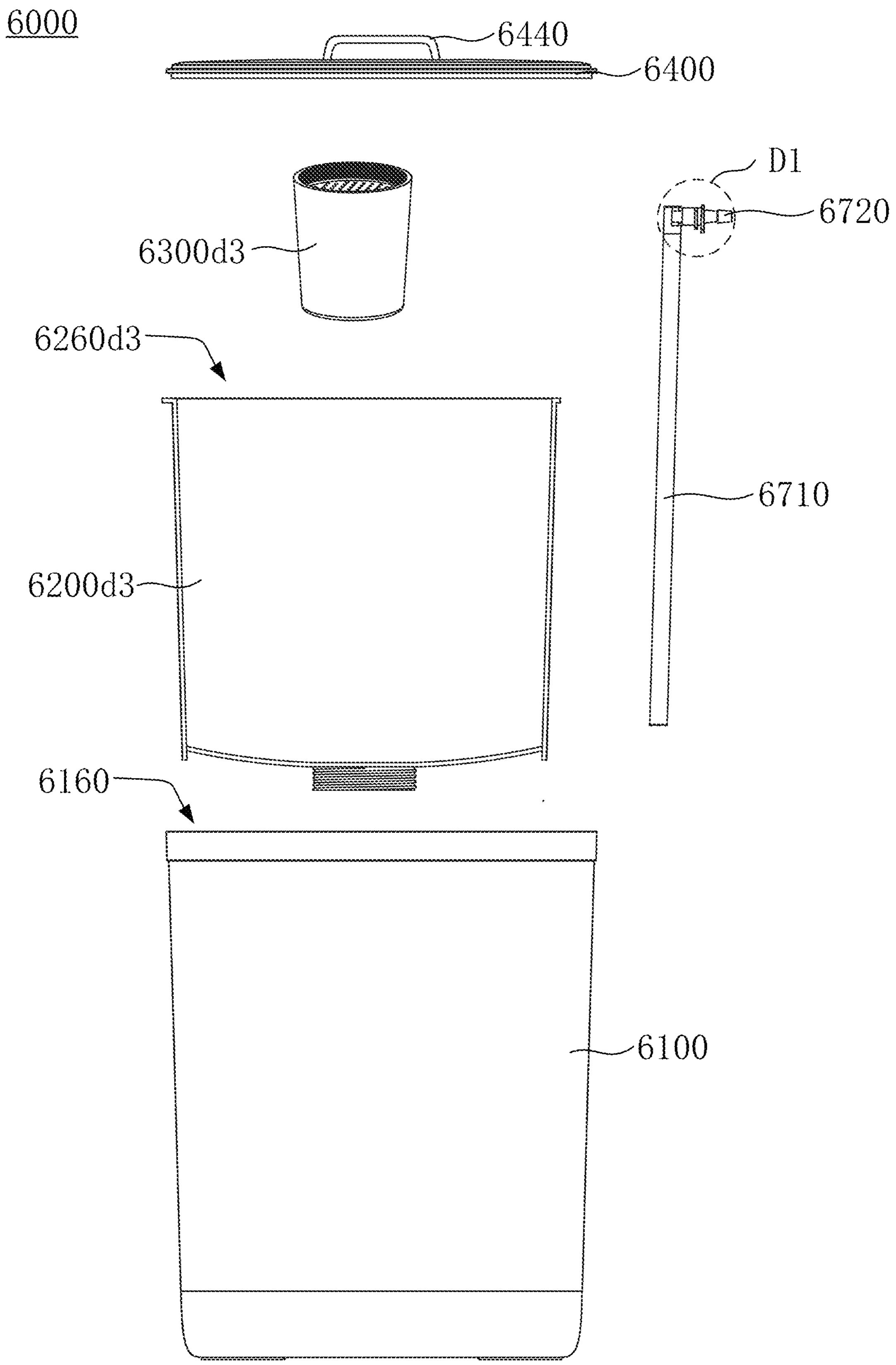
FIG. 11 is another exploded schematic diagram of the external water tank of the container washing machine according to one optional embodiment of the present disclosure.
Figure 12:
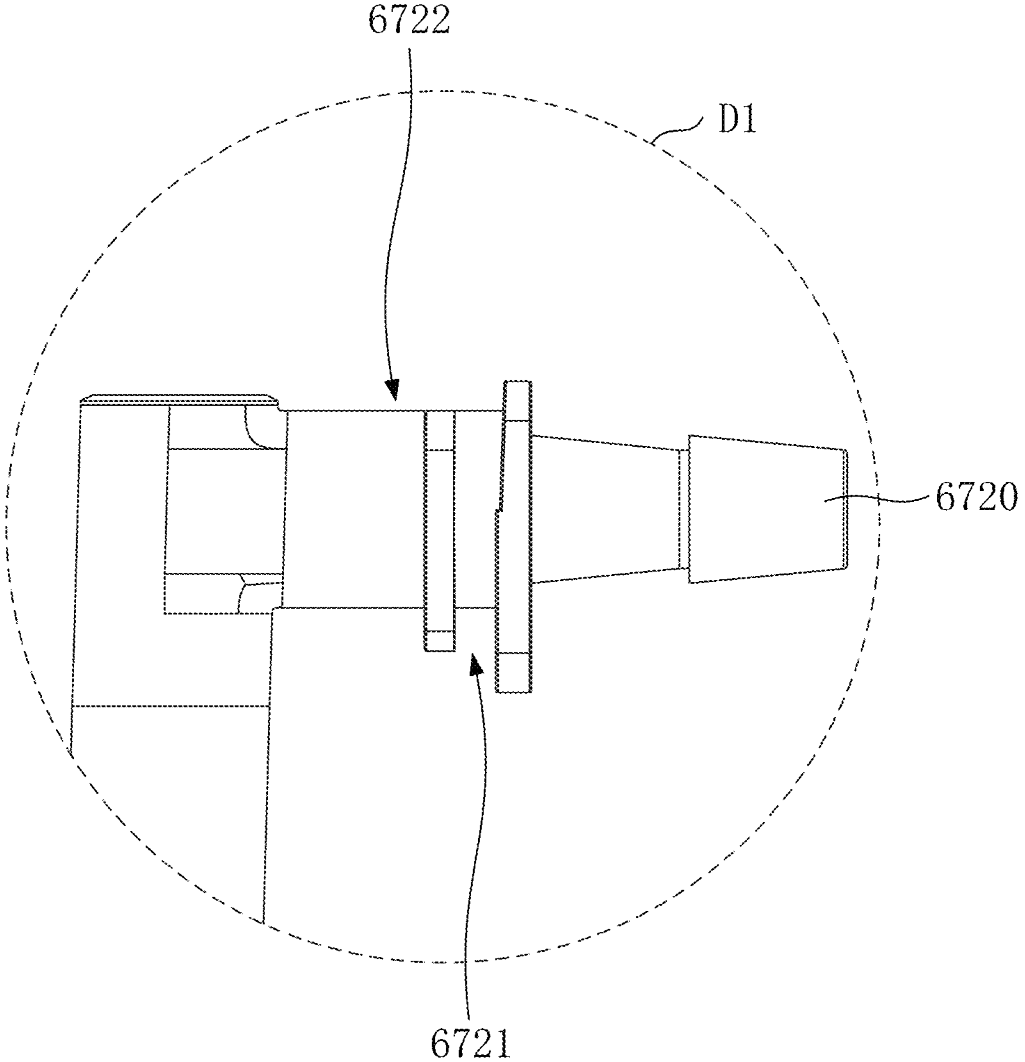
FIG. 12 is an enlarged schematic diagram of portion D1 shown in FIG. 11.
Figure 15:
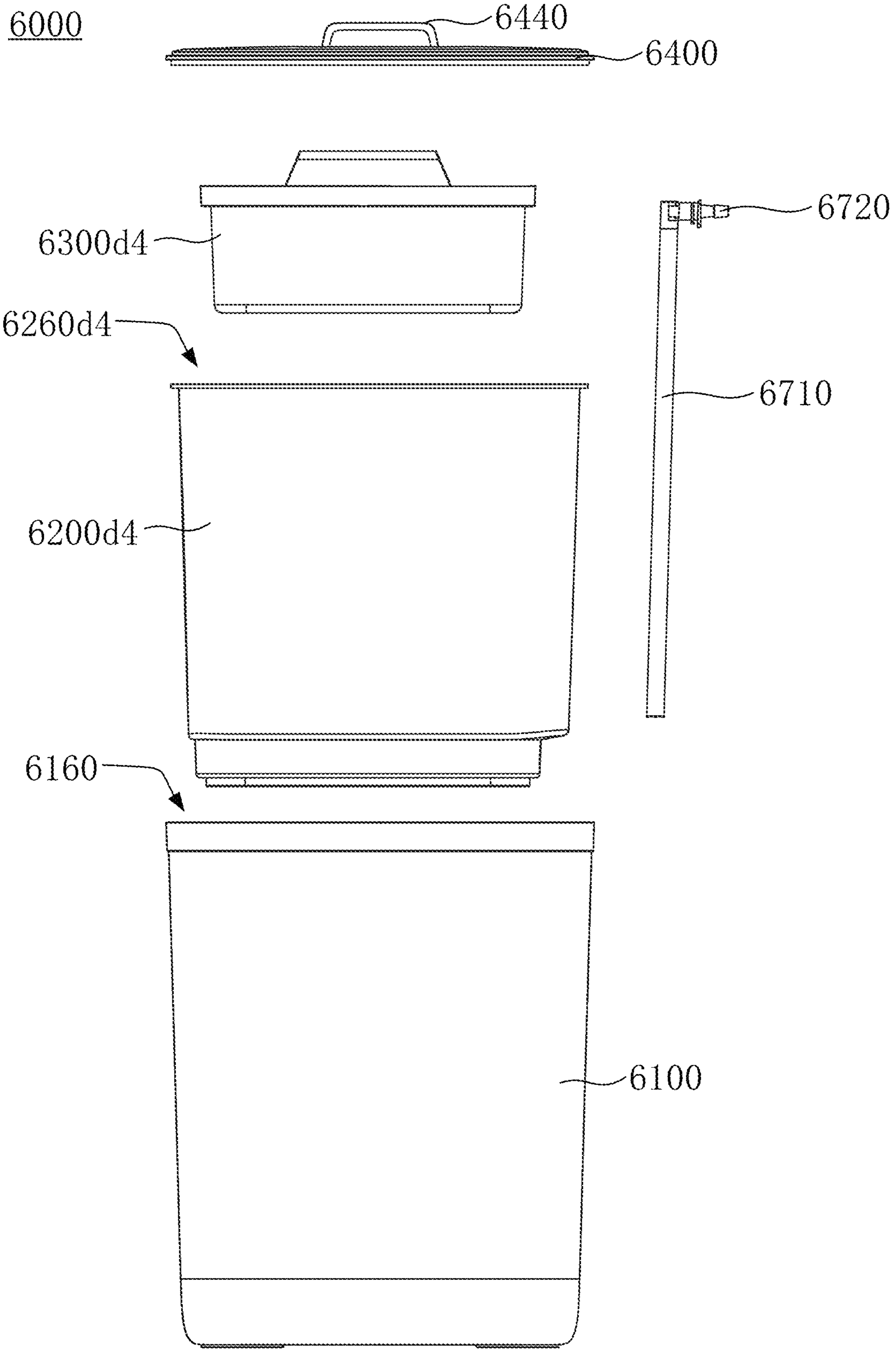
FIG. 15 is another exploded schematic diagram of the external water tank of the container washing machine according to one optional embodiment of the present disclosure.
Figure 16:
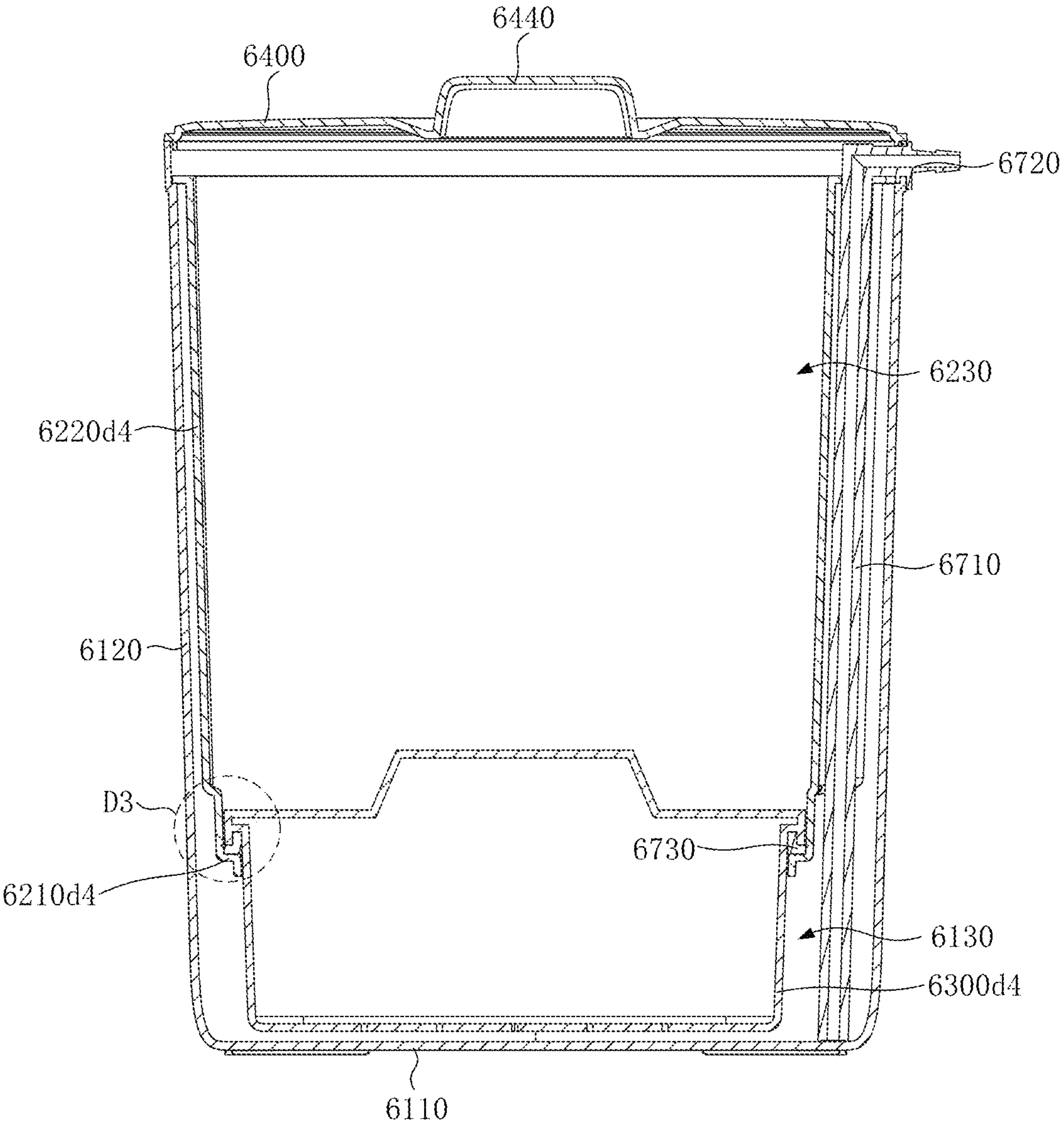
FIG. 16 is another cross-sectional schematic diagram of the external water tank of the container washing machine according to one optional embodiment of the present disclosure.
Figure 17:
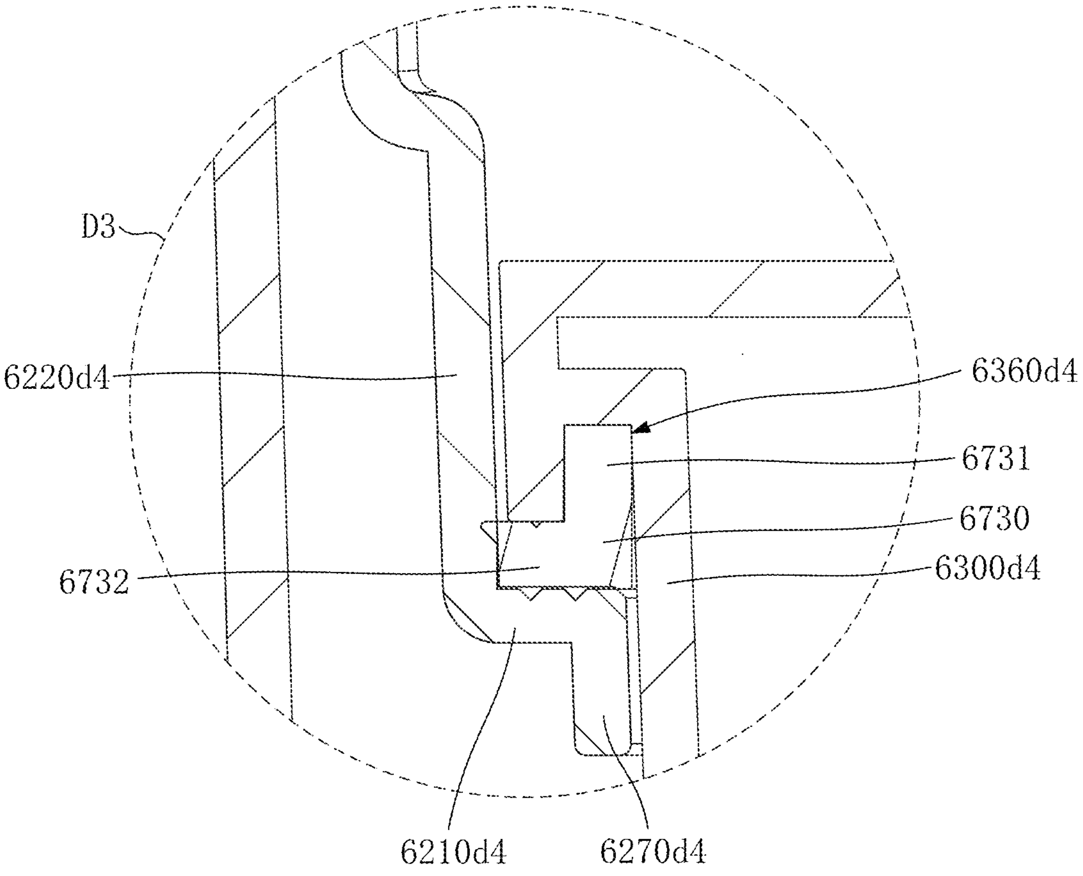
FIG. 17 is an enlarged schematic diagram of portion D3 shown in FIG. 16.
Figure 18:
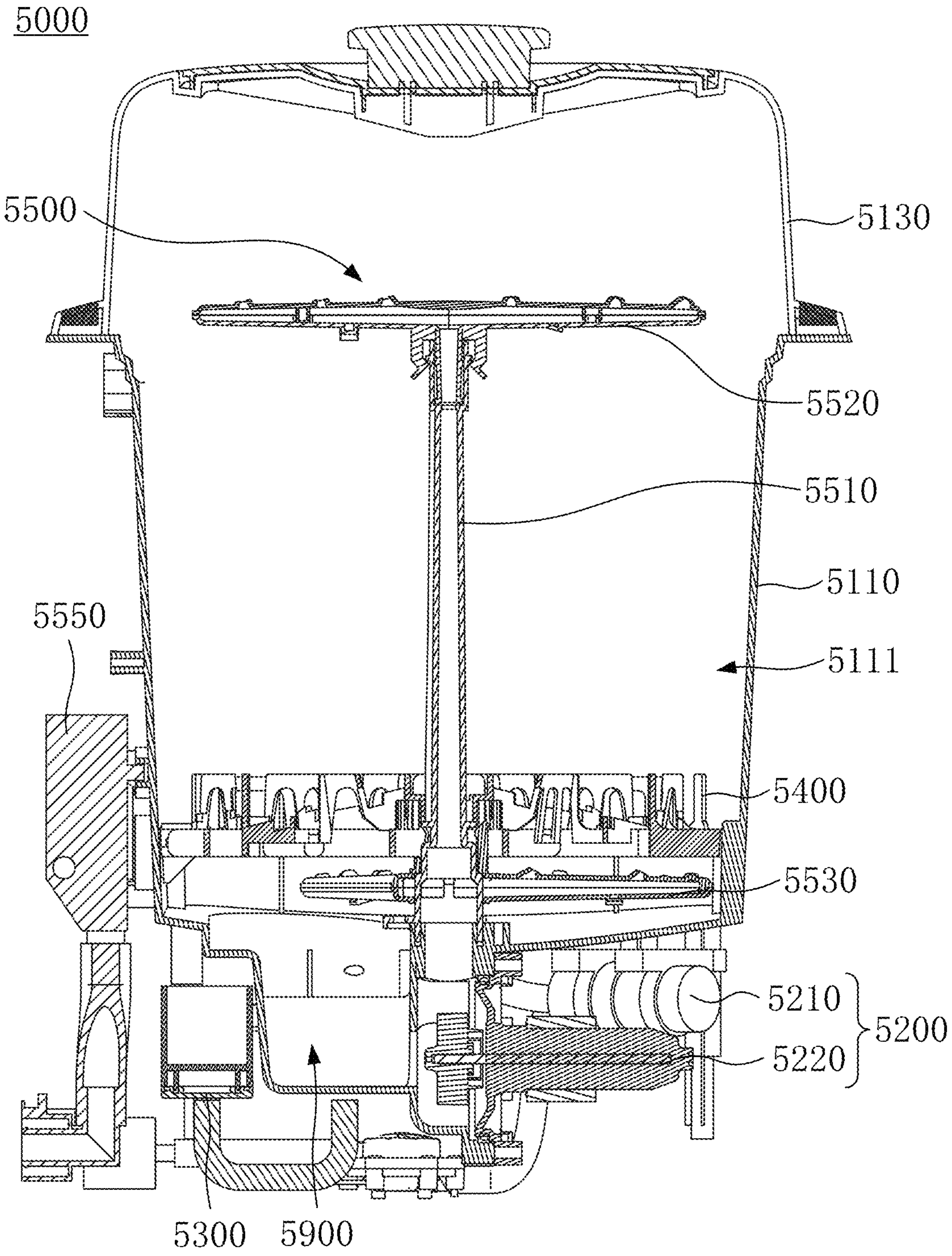
FIG. 18 is a cross-sectional schematic diagram of a washing main body of the container washing machine according to one optional embodiment of the present disclosure.

FIGS. 5-7 illustrate one optional embodiment of the filtering device 6000 of the present disclosure. FIGS. 8-10 illustrate one optional embodiment of the filtering device 6000 of the present disclosure. FIGS. 11-14 illustrate one optional embodiment of the filtering device 6000 of the present disclosure. FIGS. 15-17 illustrate one optional embodiment of the filtering device 6000 of the present disclosure.

In one embodiment, the filtering device 6000 comprises a first water tank 6100 and a filtering component (**6300*d*1, 6300*d*2, 6300*d*3, 6300*d*4). The filtering component (6300*d*1, 6300*d*2, 6300*d*3, 6300*d*4) is directly or indirectly connected to the first water tank 6100. The filtering component (6300*d*1, 6300*d*2, 6300*d*3, 6300*d*4) is directly connected to the first water tank 6100, which is understood as that the filtering component (6300*d*1, 6300*d*2, 6300*d*3, 6300*d*4) and the first water tank 6100 are directly connected to other components therebetween. The filtering component (6300*d*1, 6300*d*2, 6300*d*3, 6300*d*4) is indirectly connected to the first water tank 6100, which is understood as that the filtering component (6300*d*1, 6300*d*2, 6300*d*3, 6300*d*4) and the first water tank 6100 are connected through at least one intermediate component. The embodiments of the present disclosure take an example that the filtering component (6300*d*1, 6300*d*2, 6300*d*3, 6300*d*4) and the first water tank 6100** are indirectly connected for further illustration.

The filtering component (**6300*d*1, 6300*d*2, 6300*d*3, 6300*d*4) is configured to filter calcium and magnesium ions in water. That is, the filtering component (6300*d*1, 6300*d*2, 6300*d*3, 6300*d*4) is configured to filter calcium ions and magnesium ions in the water. For instance, the filtering component (6300*d*1, 6300*d*2, 6300*d*3, 6300*d*4) has built-in ion exchange resin or a composite filter membrane, and the filtering component (6300*d*1, 6300*d*2, 6300*d*3, 6300*d*4) is able to adsorb calcium ions and magnesium ions in the water through the built-in ion exchange resin or the composite filter membrane to realize a filtration of calcium ions and magnesium ions in the water. For instance, the filtering component (6300*d*1, 6300*d*2, 6300*d*3, 6300*d*4) adopts a detachable design. Namely, the filtering component (6300*d*1, 6300*d*2, 6300*d*3, 6300*d*4) is detachable. When the filtering component (6300*d*1, 6300*d*2, 6300*d*3, 6300*d*4) has adsorbed sufficient calcium ions and/or magnesium ions, the filtering component (6300*d*1, 6300*d*2, 6300*d*3, 6300*d*4) is allowed to be replaced with a new filtering component. Thus, it avoids residue of water stains or minerals in the washing main body due to a decreased ability of the filtering component (6300*d*1, 6300*d*2, 6300*d*3, 6300*d*4) to adsorb calcium ions and magnesium ions in the water. That is, the filtering component (6300*d*1, 6300*d*2, 6300*d*3, 6300*d*4**) is replaceable.

In the embodiments of the present disclosure, the filtering component (6300*d*1, 6300*d*2, 6300*d*3, 6300*d*4) is capable of conveying filtered water into the first water tank 6100.

The first water tank 6100 comprises a bottom wall 6110 and side walls 6120, and the side walls 6120 are connected around the bottom wall 6110 to define a water tank cavity 6130 and a water inlet 6160. The water tank cavity 6130 and the water inlet 6160 are communicated with each other. The water tank cavity 6130 is configured to store water, such as the water filtered by the filtering component (6300*d*1, 6300*d*2, 6300*d*3, 6300*d*4). In some optional embodiments, the first water tank 6100 comprises a water hole 6140, and the water hole 6140 is defined on the bottom wall 6110 of the first water tank. In other optional embodiments, the first water tank 6100 does not comprise a water hole. As shown in FIGS. 5-10, the first water tank 6100 comprises a water tank cavity 6130, a water inlet 6160, and a water hole 6140. The water tank cavity 6130 is communicated with the water inlet 6160 and the water hole 6140. The first water tank 6100 further comprises a third connecting structure 6150 disposed on an outer surface of the bottom wall 6110. The third connecting structure 6150 is sleeved with a first connecting end 7110 of the connecting assembly 7000. For instance, the first connecting end 7110 of the connecting assembly 7000 is sleeved on an outer surface of the third connecting structure 6150.

In one embodiment, as shown in FIGS. 1-4 and 18, the filtering device 6000 is detachably connected to the water inlet driving device 5200 of the washing main body 5000 through the connecting assembly 7000. For example, the water inlet driving device 5200 and the connecting assembly 7000 are detachably connected. For instance, the water inlet driving device 5200 comprises an inlet pump 5210, and the inlet pump 5210 is detachably connected to the connecting assembly 7000.

The inlet pump 5210 is configured to pump the water in the first water tank 6100 into the washing main body 5000. Specifically, the washing main body 5000 defines a water tank cavity 5900, and the inlet pump 5210 is configured to pump the water in the first water tank 6100 into the water tank cavity 5900.

The washing main body 5000 comprises a housing assembly 5100. The housing assembly 5100 comprises an inner container 5110. The inner container 5110 defines a washing space 5111 for placing the containers. Furthermore, the washing main body 5000 further comprises at least one rack 5400, and the at least one rack 5400 is configured to accommodate the containers such as baby bottles. Further, the washing main body 5000 further comprises a washing device 5500, and the washing device 5500 is configured to wash the containers placed on the at least one rack 5400 by using the water from the first water tank 6100. Specifically, the washing device 5500 is configured to drive the water in the water tank cavity 5900 into the inner container 5110 to wash the containers placed on the at least one rack 5400.

In one embodiment, the washing device 5500 comprises a washing pump 5540, a main water pipe 5510, and at least one spray arm. For instance, the washing device 5500 comprises two spray arms, which are respectively an upper spray arm 5520 and a lower spray arm 5530. Both the upper spray arm 5520 and the lower spray arm 5530 are connected to and communicated with the main water pipe 5510. Both the upper spray arm 5520 and the lower spray arm 5530 are capable of rotating around the main water pipe 5510. The main water pipe 5510 is communicated with the washing pump 5540. The washing pump 5540 is configured to pump the water in the water tank cavity 5900 into the main water pipe 5510 and pump the water in the main water pipe 5510 into the upper spray arm 5520 and the lower spray arm 5530. Furthermore, the washing pump 5540 is configured to pump the water in the upper spray arm 5520 and the lower spray arm 5530 to spray into the washing space 5111 of the inner container 5110 to wash the containers placed on the at least one rack 5400.

In other optional embodiments, there is only one spray arm, which is the upper spray arm 5520 or the lower spray arm 5530.

In one embodiment, the at least one rack 5400 comprises only one rack. The rack 5400 is disposed below the upper spray arm 5520 and above the lower spray arm 5530, and the rack 5400 is connected to the main water pipe 5510. The rack 5400 is closer to the lower spray arm 5530 than to the upper spray arm 5520. In the embodiments of the present disclosure, the rack 5400 is defined, for example, as a lower rack 5400. In other optional embodiments, there are two racks. For example, an upper rack is disposed above the upper spray arm 5520.

In one embodiment, the housing assembly 5100 further comprises a top cover 5130, and the top cover 5130 is configured to cover the inner container 5110 to close an opening of the washing space 5111. Optionally, the top cover 5130 is transparent.

It should be noted that various components of the connecting assembly 7000 in the embodiments of the present disclosure are communicated with each other after being connected.

It should be noted that the connecting assembly 7000 is capable of being communicated with the filtering device 6000 after being connected thereto, and the connecting assembly 7000 is capable of being communicated with the washing main body 5000 after being connected thereto.

In one embodiment, the washing main body 5000 further comprises a drainage driving device 5300, and the drainage driving device 5300 is configured to discharge used water in the washing main body 5000 out of the washing main body 5000. Specifically, the drainage driving device 5300 comprises a drainage pump.

Furthermore, the washing device 5500 has different washing modes, such as a non-circulating washing mode and a circulating washing mode. In a case where the washing device 5500 is capable of realizing circulating washing, the washing device 5500 is defined as a circulating washing device. The washing device 5500 further comprises a circulator 5550, which is also referred to as a breather. The circulator 5550 is communicated with the drainage driving device 5300. The drainage driving device 5300 is configured to convey water discharged from the inner container 5110 to the circulator 5550. The circulator 5550 comprises a drainage hole and is capable of discharging water through the drainage hole. The circulator 5550 is further connected to the inner container 5110 and communicated with the washing space 5111, and the circulator 5550 is capable of conveying water accommodated therein to the inner container 5110 to realize circulation in some cases.

In a case where the washing device 5500 is capable of realizing non-circulating washing, the drainage driving device 5300 is configured to directly discharge the water discharged from the inner container 5110 to an outside of the washing main body 5000 through the drainage hole of the washing main body 5000.

As shown in FIGS. 5-17, the filtering device 6000 further comprises a second water tank (6,200*d*1, 6,200*d*2, 6,200*d*3, 6,200*d*4). The second water tank (6200*d*1, 6200*d*2, 6200*d*3, 6200*d*4) is detachably connected to the first water tank 6100.

At least a portion of the second water tank (6200*d*1, 6200*d*2, 6200*d*3, 6200*d*4) is disposed in the first water tank 6100. The second water tank (6200*d*1, 6200*d*2, 6200*d*3, 6200*d*4) is detachably connected to the filtering component (6300*d*1, 6300*d*2, 6300*d*3, 6300*d*4), and the filtering component (6300*d*1, 6300*d*2, 6300*d*3, 6300*d*4) is indirectly connected to the first water tank 6100 through the second water tank (6200*d*1, 6200*d*2, 6200*d*3, 6200*d*4). In some optional embodiments, at least a portion of the filtering component (6300*d*1, 6300*d*2, 6300*d*3, 6300*d*4) is disposed in the second water tank (6200*d*1, 6200*d*2, 6200*d*3, 6200*d*4).

The second water tank (6200*d*1, 6200*d*2, 6200*d*3, 6200*d*4) comprises a bottom wall (6210*d*1, 6210*d*2, 6210*d*3, 6210*d*4) and side walls (6220*d*1, 6220*d*2, 6220*d*3, 6220*d*4) connected to a periphery of the bottom wall (6210*d*1, 6210*d*2, 6210*d*3, 6210*d*4). The side walls (6220*d*1, 6220*d*2, 6220*d*3, 6220*d*4) are connected around the periphery of the bottom wall (6210*d*1, 6210*d*2, 6210*d*3, 6210*d*4) to define a water tank cavity (6230*d*1, 6230*d*2, 6230*d*3, 6230*d*4) and a water inlet (6260*d*1, 6260*d*2, 6260*d*3, 6260*d*4). The water tank cavity (6230*d*1, 6230*d*2, 6230*d*3, 6230*d*4) and the water inlet (6260*d*1, 6260*d*2, 6260*d*3, 6260*d*4) are communicated with each other.

The second water tank (6200*d*1, 6200*d*2) further comprises a water hole (6240*d*1, 6240*d*2), and the water hole (6240*d*1, 6240*d*2) is defined on the bottom wall (6210*d*1, 6210*d*2) of the second water tank. The water hole of the second water tank (6200*d*3, 6200*d*4) shown in FIG. 13 and FIG. 16 may be referred to the water hole (6240*d*1, 6240*d*2) of the second water tank (6200*d*1, 6200*d*2) shown in FIG. 6 or FIG. 9, and details are not repeatedly described herein.

In one embodiment, a capacity of the second water tank (6200*d*1, 6200*d*2, 6200*d*3, 6200*d*4) is less than a capacity of the first water tank 6100. At least a portion of the second water tank (6200*d*1, 6200*d*2, 6200*d*3, 6200*d*4) is disposed in the first water tank 6100. For instance, the second water tank (6200*d*1, 6200*d*2, 6200*d*3, 6200*d*4) is completely placed in the first water tank 6100.

In one embodiment, the capacity of the second water tank (6200*d*1, 6200*d*2, 6200*d*3, 6200*d*4) is 2-6 L.

In one embodiment, the filtering component (6300*d*1, 6300*d*2, 6300*d*3, 6300*d*4) is capable of filtering a water flow of 8-12 L/h and is applicable to inlet water with a hardness ≤300 mg/L.

FIGS. 5-7 exemplarily illustrate an optional manner in which the filtering component 6300*d*1 and the second water tank 6200*d*1 are detachably connected. A first connecting structure 6350*d*1 is disposed on one end of the filtering component 6300*d*1, the second water tank 6200*d*1 further comprises a second connecting structure 6250*d*1 disposed on an outer surface of the bottom wall 6210*d*1 of the second water tank, and the first connecting structure 6350*d*1 and the second connecting structure 6250*d*1 are detachably connected. Specifically, the first connecting structure 6350*d*1 comprises a first thread 6351*d*1, and the second connecting structure 6250*d*1 comprises a second thread 6251*d*1. The first thread 6351*d*1 is threadedly connected to the second thread 6251*d*1.

In one embodiment, a connecting wall 6352*d*1 extending upward is disposed on an edge of a first end surface 6310*d*1 of the filtering component 6300*d*1, and the first thread 6351*d*1 is disposed on an inner surface of the connecting wall 6352*d*1 of the filtering component 6300*d*1. A connecting end 6252*d*1 extending downward is disposed on the outer surface of the bottom wall 6210*d*1 of the second water tank 6200*d*1, and the second thread 6251*d*1 is disposed on an outer surface of the connecting end 6252*d*1 of the second water tank 6200*d*1.

In other optional embodiments, the first thread 6351*d*1 is directly disposed on an outer surface of the filtering component 6300*d*1, and the second thread 6251*d*1 is disposed on an inner surface of the connecting end 6252*d*1 of the second water tank 6200*d*1.

In one embodiment, the water hole 6240*d*1 penetrates through the connecting end 6252*d*1. When the filtering component 6300*d*1 is connected to the connecting end 6252*d*1, water in the second water tank 6200*d*1 flows into the filtering component 6300*d*1 through the water hole 6240*d*1, and after being filtered by the filtering component 6300*d*1, flows into the first water tank 6100 from the water outlet hole of the filtering component 6300*d*1.

As shown in FIGS. 5-10, in the embodiments of the present disclosure, to facilitate a detachment of the second water tank (6200*d*1 or 6200*d*2) from the first water tank 6100, the second water tank (6200*d*1 or 6200*d*2) further comprises handle portions 6222*d*1, and the handle portions 6222*d*1 are disposed on the side walls 6220*d*1. Specifically, two opposite through holes 6223*d*1 are defined on the side walls 6220*d*1 of the second water tank, and the two opposite through holes 6223*d*1, and there are two handle portions 6222*d*1, and each of the handle portions 6222*d*1 is located above a corresponding one of the two opposite through holes 6223*d*1. It should be noted that the second water tank (6200*d*3, 6200*d*4) may also comprise the handle portions, and reference may be made specifically to the handle portions 6222*d*1, which are not repeatedly described herein.

Exemplarily, please continue to refer to FIG. 5, FIG. 6, FIG. 7, FIG. 8, FIG. 9, and FIG. 10. The second water tank (6200*d*1 or 6200*d*2) further comprises a rim (6221*d*1 or 6221*d*2), and the rim (6221*d*1 or 6221*d*2) is disposed on ends of the side walls (6220*d*1, 6220*d*2) away from the bottom wall (6210*d*1, 6210*d*2) of the second water tank. The first water tank 6100 further comprises a first bearing platform 6121. The first bearing platform 6121 is disposed on inner surfaces of the side walls 6120 of the first water tank, and the first bearing platform 6121 is located below top ends of the side walls 6120 of the first water tank. The rim (6221*d*1 or 6221*d*2) is configured to be placed on the first bearing platform 6121. It should be noted that the second water tank (6200*d*3, 6200*d*4) further comprises a rim (6221*d*3, 6221*d*4), for which reference may be made specifically to the rim (6221*d*1 or 6221*d*2), and details are not repeatedly described herein.

In one embodiment, as shown in FIGS. 5-10, the filtering device 6000 further comprises a top cover 6400, and the top cover 6400 is configured to cover the water inlet (6260*d*1, 6260*d*2) of the second water tank (6200*d*1, 6200*d*2). Specifically, the top cover 6400 comprises a flange 6410, the first water tank 6100 further comprises a second bearing platform 6122, and the second bearing platform 6122 is located above the first bearing platform 6121. For instance, the second bearing platform 6122 is disposed at the top ends of the side walls 6120 (that is, the ends of the side walls 6120 away from the bottom wall 6110). The flange 6410 of the top cover 6400 is configured to be placed on the second bearing platform 6122. In one optional embodiment, an inner surface of the top cover 6400 abuts against the rim (6221*d*1 or 6221*d*2) of the second water tank (6200*d*1 or 6200*d*2), thereby avoiding shaking of the second water tank (6200*d*1 or 6200*d*2). It should be noted that a connection relationship between the second water tank (6200*d*3, 6200*d*4) and the top cover 6400 may refer to a connection relationship between the top cover 6400 and the second water tank (6200*d*1, 6200*d*2), and details are not repeatedly described herein.

As shown in FIGS. 5-10, the filtering component (6300*d*1 or 6300*d*2) comprises a first end surface (6310*d*1 or 6310*d*2) and a second end surface (6320*d*1 or 6320*d*2) disposed opposite to the first end surface (6310*d*1 or 6310*d*2). The filtering component (6300*d*1 or 6300*d*2) further comprises water inlet holes (6330*d*1 or 6330*d*2) disposed on the first end surface (6310*d*1 or 6310*d*2) and a water outlet hole (6330*d*1 or 6330*d*2) disposed on the second end surface (6320*d*1 or 6320*d*2). Specifically, an area of the first end surface (6310*d*1 or 6310*d*2) of the second water tank is greater than an area of the second end surface (6320*d*1 or 6320*d*2) of the second water tank.

As shown in FIGS. 5-10, a diameter of the filtering component (6300*d*1 or 6300*d*2) gradually decreases from the first end surface (6310*d*1 or 6310*d*2) toward the second end surface (6320*d*1 or 6320*d*2) of the second water surface. Specifically, the filtering component (6300*d*1 or 6300*d*2) has a truncated cone structure.

It should be noted that a structure of the filtering component (6300*d*3, 6300*d*4) may refer to a structure of the filtering component (6300*d*1 or 6300*d*2), and details are not repeatedly described herein.

In other optional embodiments, the filtering device 6000 may not comprise the second water tank (6200*d*1 or 6200*d*2), and the first water tank 6100 of the filtering device 6000 is directly connected to the filtering component (6300*d*1 or 6300*d*2).

Differences between the filtering device 6000 shown in FIGS. 8-10 and the filtering device 6000 shown in FIGS. 5-7 comprise that the second water tank 6200*d*2 shown in FIGS. 8-10 is different from the second water tank 6200*d*1 shown in FIGS. 5-7, and the filtering component 6300*d*2 shown in FIGS. 8-10 is different from the filtering component 6300*d*1 shown in FIGS. 5-7. FIGS. 8 and 10 illustrate another optional detachable connection method between the second water tank 6200*d*2 and the filtering component 6300*d*2. Specifically, the second water tank 6200*d*2 further comprises a tank wall 6250*d*2, the tank wall 6250*d*2 is connected to the bottom wall 6210*d*2, and the tank wall 6250*d*2 is disposed below the bottom wall 6210*d*2. The side walls 6220*d*2 of the second water tank are connected around the bottom wall 6210*d*2 to define a water tank cavity 6230*d*2. The tank wall 6250*d*2 defines a mounting groove 6251*d*2, and the mounting groove 6251*d*2 is communicated with the water tank cavity 6230*d*2 of the second water tank. The mounting groove 6251*d*2 is configured to mount the filtering component 6300*d*2, and the filtering component 6300*d*2 is detachably mounted in the mounting groove 6251*d*2. At least a portion of the filtering component 6300*d*2 is mounted in the mounting groove 6251*d*2. The embodiment of the present disclosure takes an example in which the filtering component 6300*d*2 is completely mounted in the mounting groove 6251*d*2 for further illustration.

It is understood that the water inlet holes 6330*d*2 of the filtering component 6300*d*2 are close to an opening of the mounting groove 6251*d*2, and the water outlet hole 6340*d*2 of the filtering component 6300*d*2 is close to the water hole 6240*d*2 of the second water tank 6200*d*2. When the filtering component 6300*d*2 is mounted in the mounting groove 6251*d*2, the water outlet hole 6340*d*2 of the filtering component 6300*d*2 is communicated with the water hole 6240*d*2 of the second water tank 6200*d*2. Specifically, a diameter of the water hole 6240*d*2 of the second water tank 6200*d*2 is greater than a diameter of the water outlet hole 6340*d*2 of the filtering component 6300*d*2.

In one embodiment, a positioning column 6270*d*2 extending upward is disposed on an inner surface of a bottom portion of the tank wall 6250*d*2; and a positioning groove 6350*d*2 recessed upward is disposed on the second end surface 6320*d*2 of the filtering component 6300*d*2. The positioning groove 6350*d*2 is configured to accommodate the positioning column 6270*d*2. The positioning column 6270*d*2 is capable of being disposed in the positioning groove 6350*d*2 to position the filtering component 6300*d*2.

The water hole 6240*d*2 of the second water tank 6200*d*2 penetrates through the bottom portion of the tank wall 6250*d*2 and the positioning column 6270*d*2.

The filtering component 6300*d*2 comprises the water inlet holes 6330*d*2 and the water outlet hole 6340*d*2 communicated with the water inlet holes 6330*d*2. The water outlet hole 6340*d*2 is communicated with the positioning groove 6350*d*2 and the water hole 6240*d*2 of the second water tank 6200*d*2. After being filtered by the filtering component 6300*d*2, the water in the second water tank 6200*d*2 flows into the first water tank 6100 through the water hole 6240*d*2.

Figure 13:
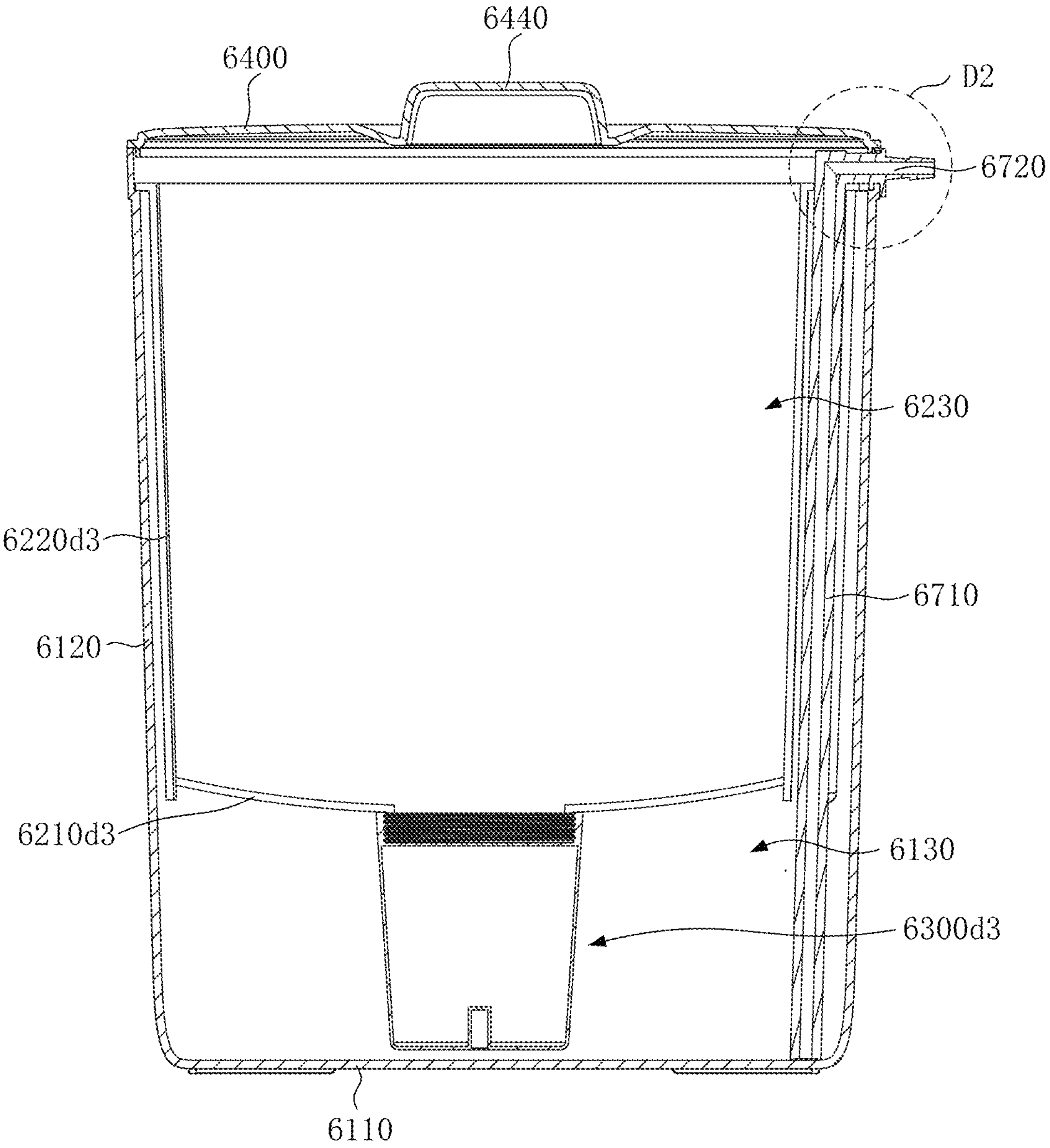
FIG. 13 is another cross-sectional schematic diagram of the external water tank of the container washing machine according to one optional embodiment of the present disclosure.
Figure 14:
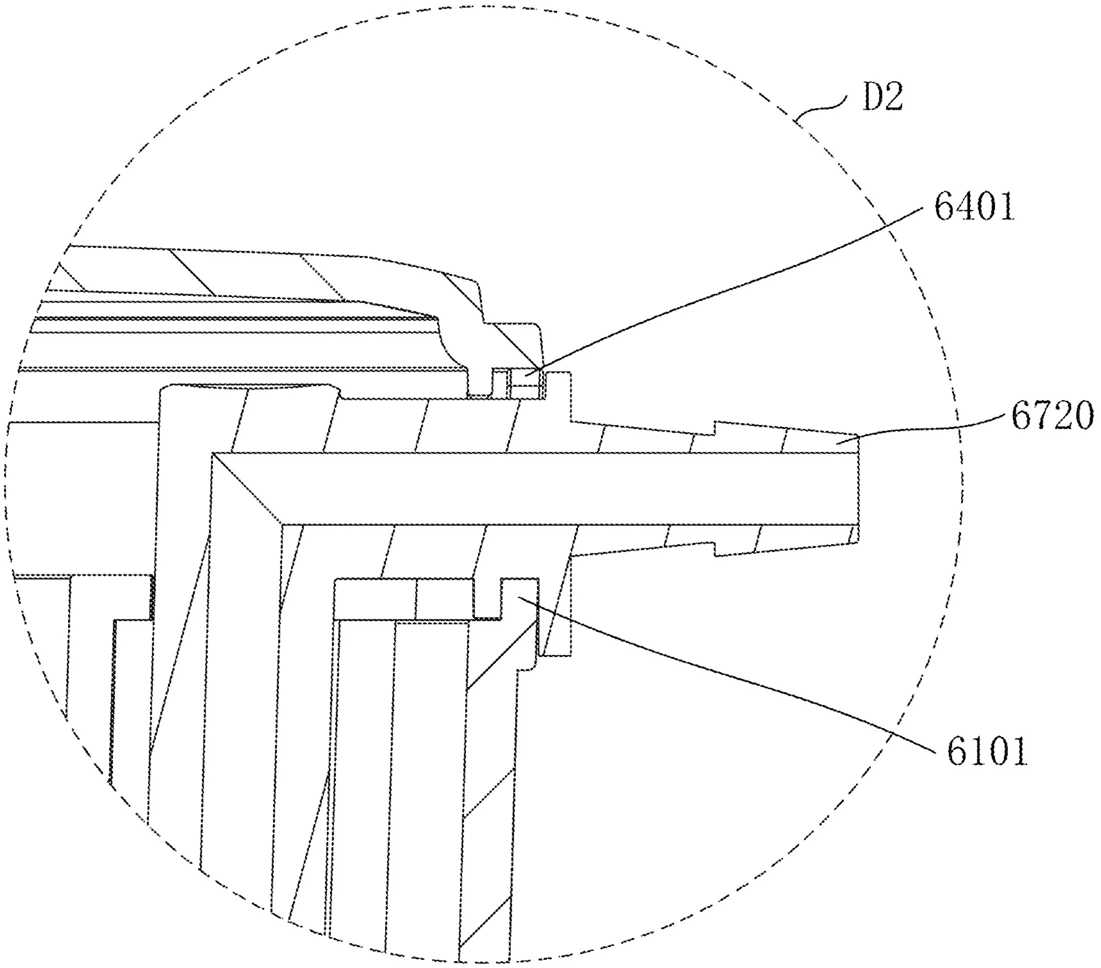
FIG. 14 is an enlarged schematic diagram of portion D2 shown in FIG. 13.

For a connection method between the filtering component 6300*d*3 and the second water tank 6200*d*3 shown in FIGS. 13 and 15, reference may be made to the connection method between the filtering component 6300*d*1 and the second water tank 6200*d*1, or to the connection method between the filtering component 6300*d*2 and the second water tank 6200*d*2, and details are not repeatedly described herein.

FIGS. 15-17 illustrate one optional detachable connection method between the filtering component 6300*d*4 and the second water tank 6200*d*4. The second water tank 6200*d*4 further comprises a reinforcing wall 6270*d*4. The reinforcing wall 6270*d*4 is connected to the bottom wall 6210*d*4, and the reinforcing wall 6270*d*4 is located below the bottom wall 6210*d*4 and the side walls 6220*d*4 of the second water tank. A portion of the filtering component 6300*d*4 is disposed on the bottom wall 6210*d*4 of the second water tank, and the portion of the filtering component 6300*d*4 is surrounded by the reinforcing wall 6270*d*4. Specifically, a portion of the filtering component 6300*d*4 passes through the bottom wall 6210*d*4 and the reinforcing wall 6270*d*4 and is disposed below the second water tank 6200*d*4. A connection position between the filtering component 6300*d*4 and the second water tank 6200*d*4 is sealed. Furthermore, the filtering device 6000 further comprises a sealing ring 6730, and the sealing ring 6730 is disposed between the connection position of the filtering component 6300*d*4 and the second water tank 6200*d*4. Further, the sealing ring 6730 comprises a first sealing portion 6731 and a second sealing portion 6732 connected to the first sealing portion 6731. A sealing groove 6360*d*4 is defined on the filtering component 6300*d*4, the first sealing portion 6731 is disposed in the sealing groove 6360*d*4; and the second sealing portion 6732 is disposed on the bottom wall 6210*d*4 of the second water tank.

Figure 1:
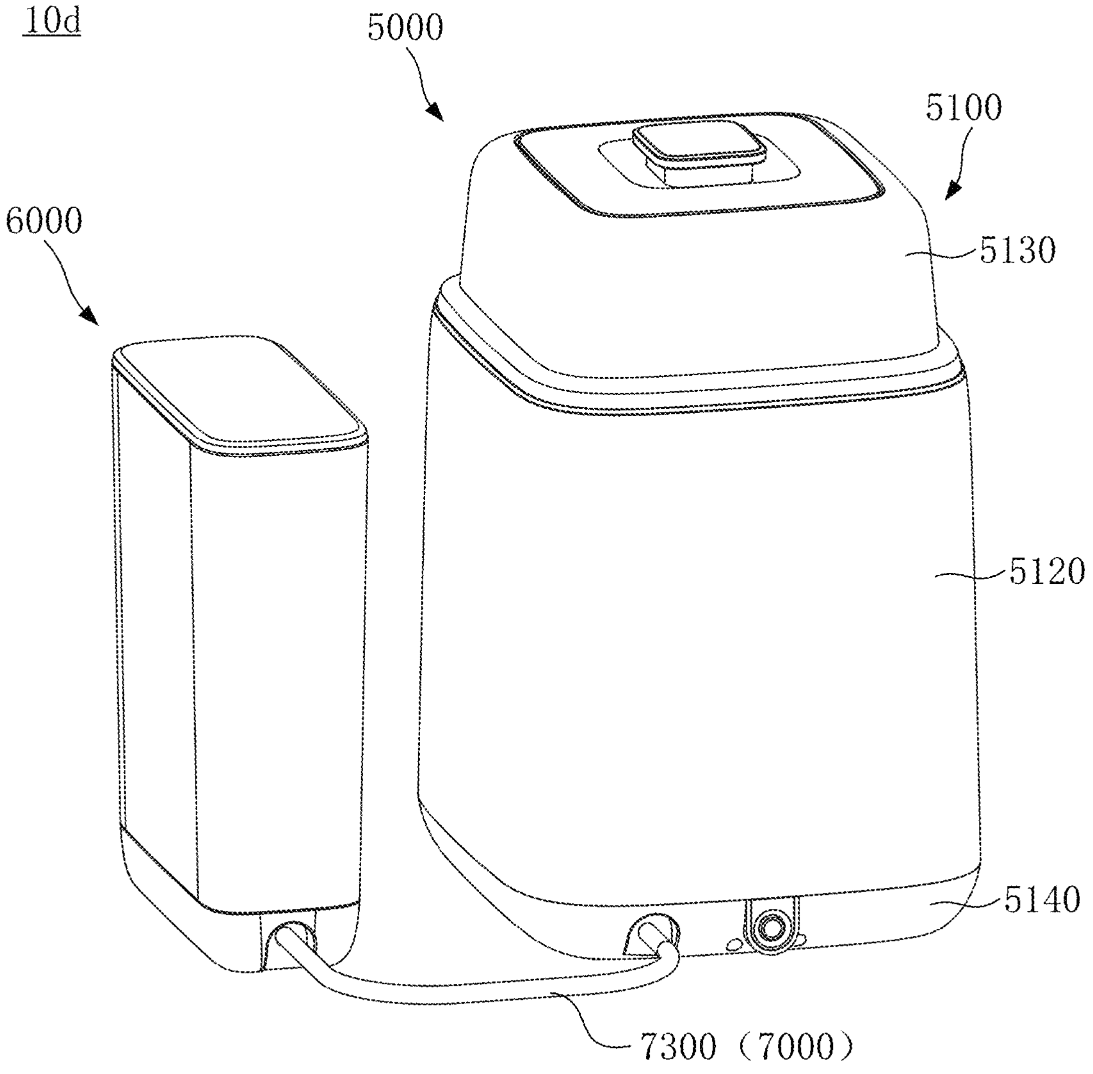
FIG. 1 is a schematic diagram of a container washing machine according to one optional embodiment of the present disclosure.
Figure 2:
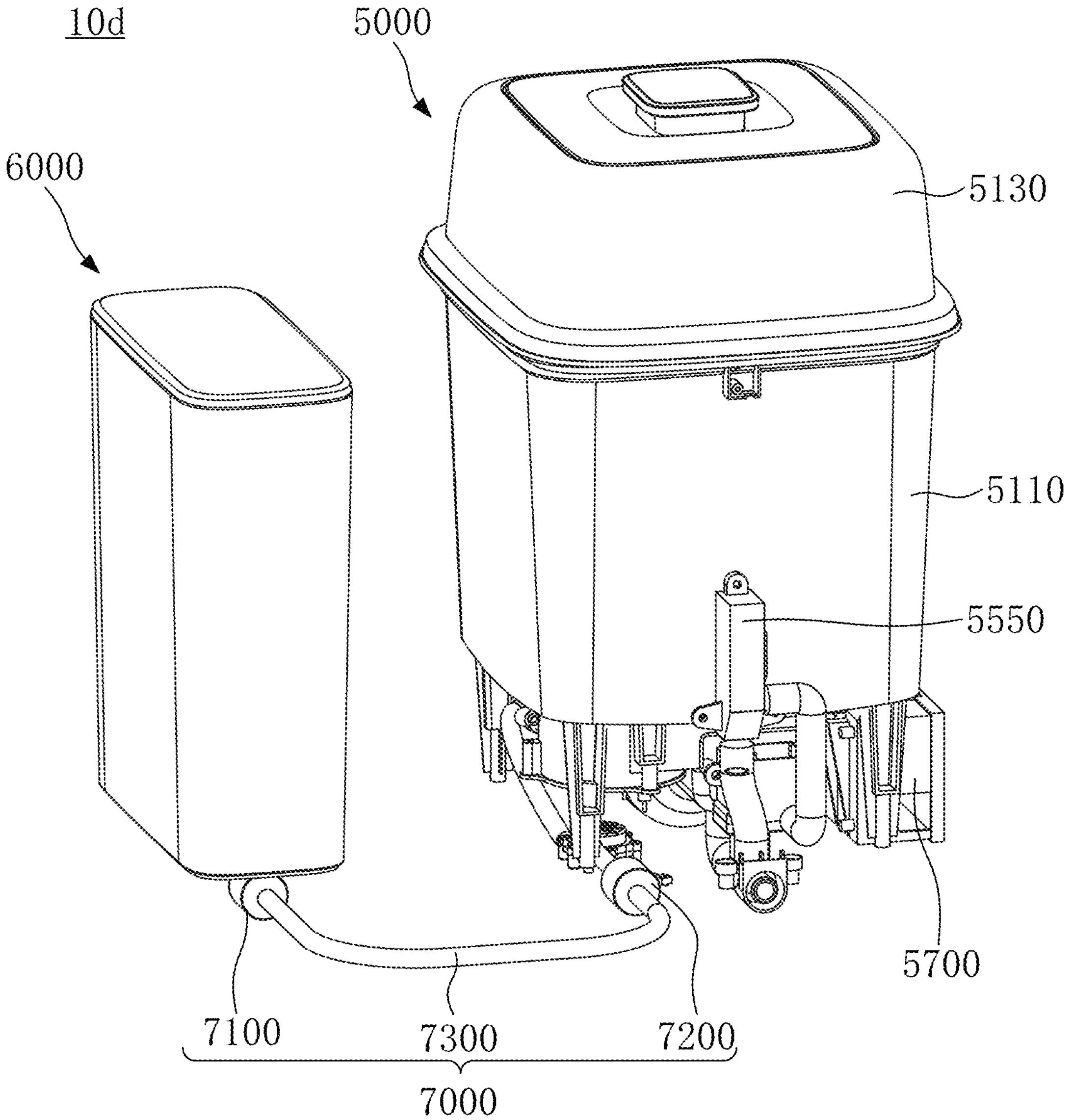
FIG. 2 is another schematic diagram of the container washing machine according to one optional embodiment of the present disclosure, where a housing and a base are removed.
Figure 3:
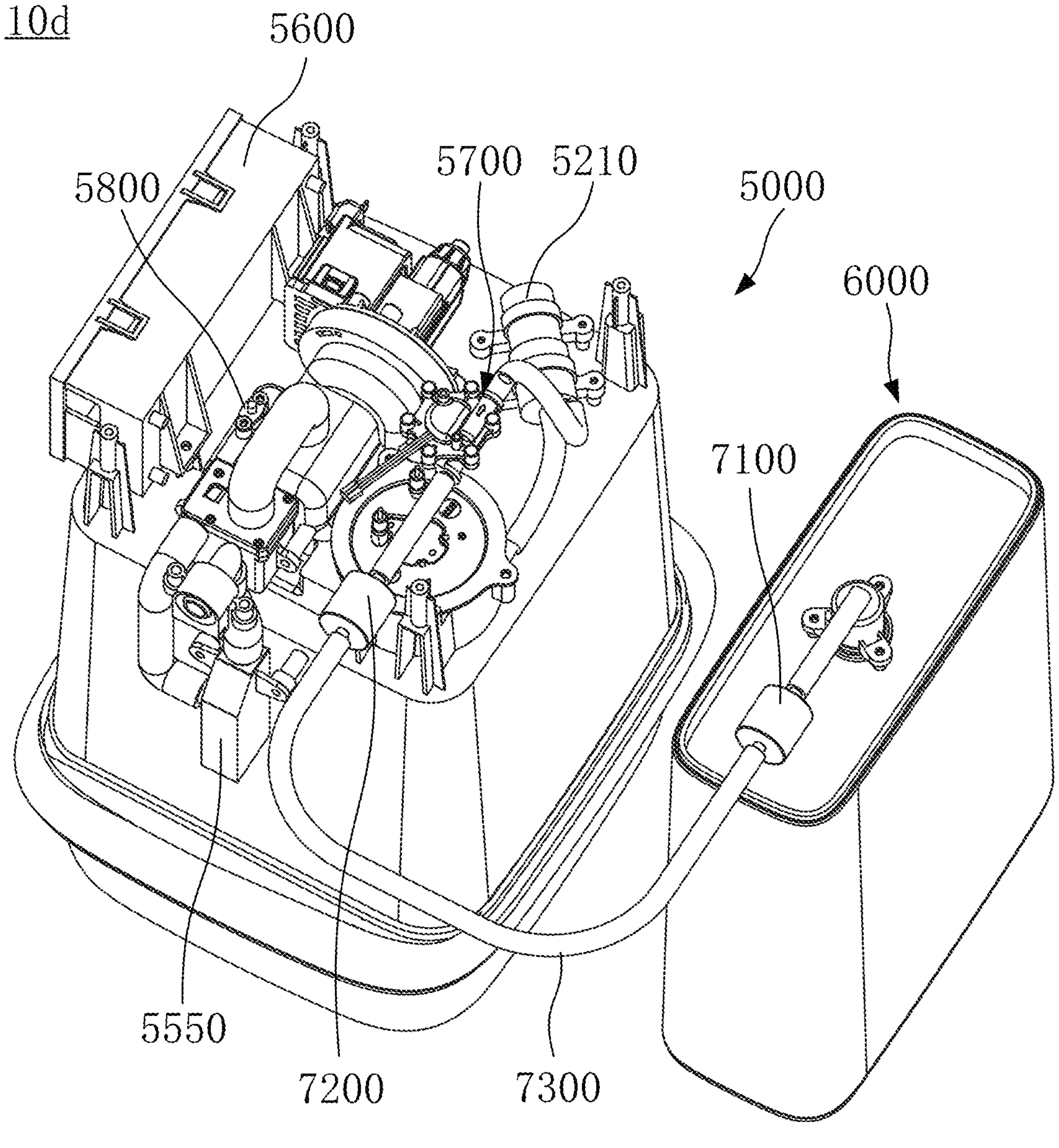
FIG. 3 is another schematic diagram of the container washing machine according to one optional embodiment of the present disclosure, where the housing and the base are removed.
Figure 4:
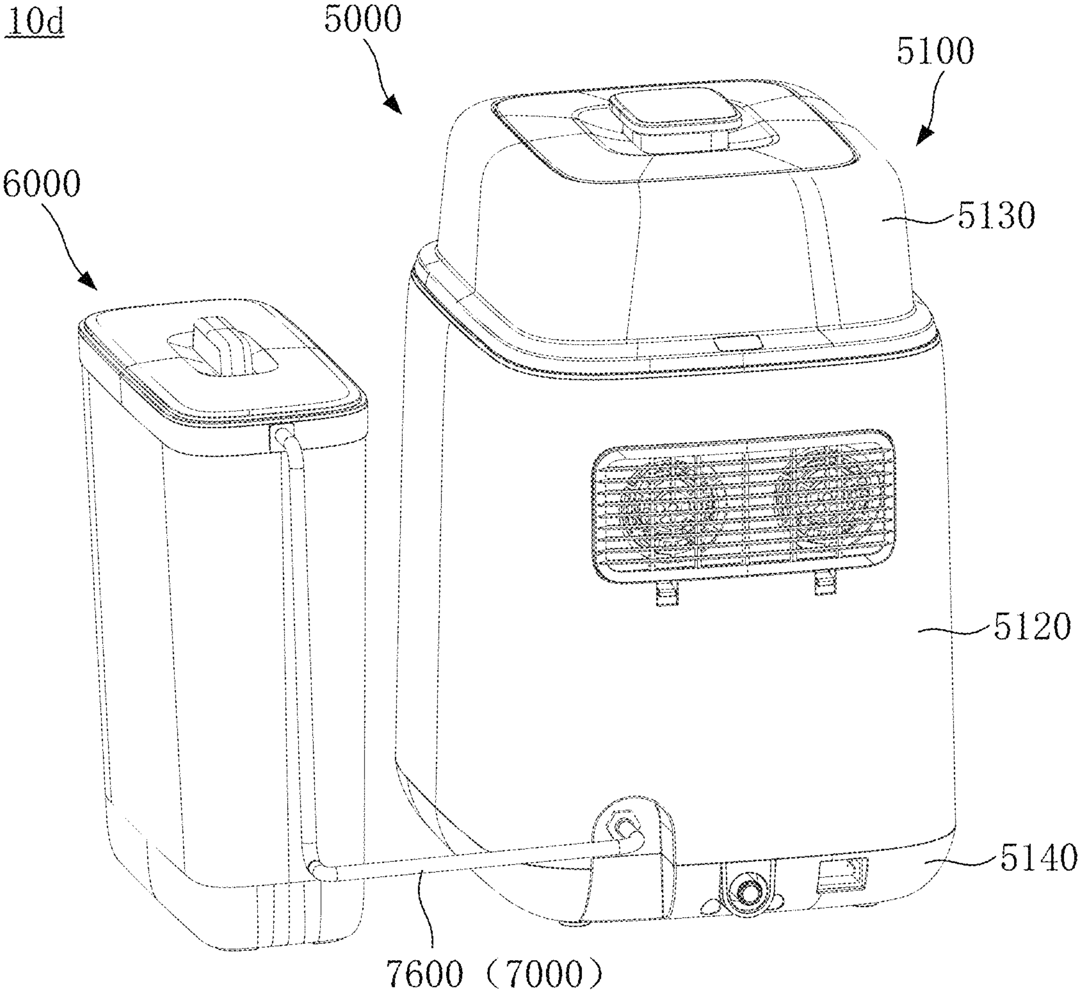
FIG. 4 is another schematic diagram of the container washing machine according to one optional embodiment of the present disclosure.

As shown in FIGS. 1-4 and 18, the first water tank 6100 is disposed outside the washing main body 5000, and the connecting assembly 7000 is connected to a lower position of the filtering device 6000. As shown in FIGS. 1-3, the connecting assembly 7000 is connected to an upper position of the filtering device 6000. As shown in FIG. 4, in other optional embodiments, the connecting assembly 7000 is connected to other positions of the filtering device 6000, which is determined according to actual needs.

In one embodiment, the first water tank 6100 is detachably connected to the connecting assembly 7000. The first water tank 6100 is directly or indirectly connected to the connecting assembly. In the embodiments of the present disclosure, the first water tank 6100 and the connecting assembly 7000 adopt a leak-proof design, which avoids water overflow during a connection and detachment process. Similarly, both the connecting assembly 7000 and the washing main body 5000 adopt a leak-proof design.

As shown in FIGS. 1-3 and 18, the connecting assembly 7000 comprises a first connecting component 7100 and a third connecting component 7300. The first connecting component 7100 is connected to and communicated with the first water tank 6100, and the first connecting component 7100 and the third connecting component 7300 are detachably connected. In one optional embodiment, the first connecting component 7100 and the first water tank 6100 are detachably connected. As shown in FIGS. 6 and 9, the first connecting component 7100 comprises a first connecting end 7110 and a second connecting end 7120. The first connecting end 7110 the first connecting component 7100 is connected to and communicated with the first water tank 6100. For example, the first water tank 6100 comprises a third connecting structure 6150. The third connecting structure 6150 is disposed on the outer surface of the bottom wall 6110. The water hole 6140 penetrates through the third connecting structure 6150. The third connecting structure 6150 and the first connecting end 7110 are sleeved with each other. For example, the first connecting end 7110 of the first connecting component 7100 is sleeved on an outer surface of the third connecting structure 6150. In order to increase the tightness of the connection between the third connecting structure 6150 and the first connecting end 7110, as shown in FIG. 3, the first connecting end 7110 of the first connecting component 7100 is directly fixed to the first water tank 6100 or indirectly fixed to the first water tank 6100 through screws or bolts. As shown in FIGS. 6 and 9, the filtering device 6000 further comprises a connecting component 6600 disposed at the bottom portion of the first water tank 6100. The first water tank 6100 further comprises an extension wall 6170 connected to an edge of the outer surface of the bottom wall 6110. At least a portion of the connecting component 6600 is disposed in a space defined by the extension wall 6170 and the bottom wall 6110. After the first connecting end 7110 of the first connecting component 7100 and the third connecting structure 6150 are sleeved with each other, the first connecting end 7110 of the first connecting component 7100 is further fixed to the connecting component 6600 through screws or bolts. It should be noted that it is also feasible to directly dispose a structure configured for connection with the screws or bolts on the outer surface of the bottom wall 6110 without providing the connecting component 6600.

As shown in FIGS. 5-10, the filtering device 6000 further comprises a base 6500. The base 6500 is connected to the first water tank 6100. The base 6500 is disposed below the first water tank 6100. A portion of the first connecting component 7100 is disposed between the base 6500 and the first water tank 6100. The second connecting end 7120 of the first connecting component 7100 is exposed from the base 6500. Specifically, the base 6500 comprises a notch 6510, and the second connecting end 7120 is disposed in the notch 6510.

In one optional embodiment, as shown in FIGS. 11-17, the filtering device 6000 further comprises a delivery pipe 6710 and a connector 6720. The delivery pipe 6710 and the connector 6720 are connected to and communicated with each other. The first water tank 6100 of the filtering device 6000 is detachably connected to the connecting assembly 7000 through the delivery pipe 6710 and the connector 6720. Specifically, the connector 6720 is detachably connected to a connecting pipe 7600 of the connecting assembly 7000. For instance, the connector 6720 and the connecting assembly 7000 are detachably sleeved with each other. The connecting pipe 7600 is a hose.

In one embodiment, at least a portion of the delivery pipe 6710 is disposed in the first water tank 6100, and at least a portion of the connector 6720 is disposed outside the first water tank 6100. The connector 6720 is disposed at a position away from the bottom wall 6110 of the first water tank 6100 and close to the water inlet 6160 of the first water tank 6100. The water inlet driving device 5200 in the washing main body 5000 is able to suck the water from the first water tank 6100 through the connecting pipe 7600 and the delivery pipe 6710. In the embodiments of the present disclosure, by disposing the connector 6720 at the position away from the bottom wall 6110, such as above the side walls 6120 of the first water tank 6100, there is no need to provide the water hole on the bottom wall 6110 of the first water tank and there is no need to provide the waterproof structure at a bottom position of the first water tank 6100. In this way, waterproof structure components are saved to a certain extent and a problem of water leakage of the filtering device 6000 is effectively solved.

In one embodiment, a first clamping groove 6721 is defined on an outer surface of the connector 6720; a first engaging structure 6101 is disposed on the top ends of the side walls of the first water tank away from the bottom wall 6110 of the first water tank 6100, and the first engaging structure 6101 is disposed in the first clamping groove 6721.

In one embodiment, a second clamping groove 6722 is defined on the outer surface of the connector 6720. The filtering device 6000 further comprises a top cover 6400. The top cover 6400 is disposed on the side walls 6120 of the first water tank 6100 to cover the water inlet 6160 of the first water tank 6100. The top cover 6400 comprises a second engaging structure 6401, and the second engaging structure 6401 is disposed in the second clamping groove 6722.

In one embodiment, the delivery pipe 6710 is disposed in the water tank cavity 6130 of the first water tank 6100 and is disposed close to inner surfaces of the side walls 6120 of the first water tank 6100. The delivery pipe 6710 is disposed between the side walls 6120 of the first water tank 6100 and the outer surface of the second water tank 6200*d*3. One end of the delivery pipe 6710 is away from the connector 6720 is disposed close to the bottom wall 6110 of the first water tank 6100, and the connector 6720 is disposed on the top ends of the side walls 6120 of the first water tank 6100 away from the bottom wall 6110 of the first water tank 6100. In other optional embodiments, a groove capable of completely accommodating the connector 6720 is defined on the side walls 6120. In other optional embodiments, a through hole capable of completely accommodating the connector 6720 is defined on the side walls 6120 of the first water tank.

In one embodiment, the top cover 6400 of the filtering device 6000 further comprises a handle 6440, and the handle 6440 is disposed on a top surface of the top cover 6400, which facilitates user operation.

In one embodiment, as shown in FIGS. 1, 2, and 4, the washing main body 5000 may further comprise a housing 5120, and the housing 5120 is disposed on an outer side of the inner container 5110.

In one embodiment, as shown in FIGS. 1, 2, and 4, the washing main body 5000 further comprises a base 5140, and the base 5140 is disposed below the inner container 5110.

In one embodiment, as shown in FIGS. 2-3, the washing main body 5000 further comprises a control device 5600, and the control device 5600 is electrically connected to electrical components in the washing main body 5000. For example, the control device 5600 is electrically connected to the inlet pump 5210, the control device 5600 is electrically connected to the washing pump 5540, and the control device 5600 is electrically connected to the drainage pump of the drainage driving device 5300. The control device 5600 is configured to control the operations of the electrical components in the washing main body 5000. Specifically, the control device 5600 is configured to control the inlet pump 5210, the washing pump 5540, and the drainage pump of the drainage driving device 5300.

In one embodiment, as shown in FIG. 3, the washing main body 5000 further comprises a flow meter 5700. The flow meter 5700 is connected to the inlet pump 5210. The flow meter 5700 and the control device 5600 are electrically connected. The flow meter 5700 is configured to output signals to the control device 5600, and the control device 5600 is capable of controlling a water inlet volume of the inlet pump 5210 according to the signals conveyed by the flow meter 5700.

In one embodiment, as shown in FIG. 3, the washing main body 5000 further comprises a temperature compensation component 5800. The temperature compensation component 5800 is electrically connected to the control device 5600, and the temperature compensation component 5800 is configured to detect a water temperature in the inner container 5110 and is capable of feeding back a detected temperature to the control device 5600. The control device 5600 is configured to judge whether a heating component of the washing main body 5000 works for heating according to a preset temperature setting, so as to control a heating power of the heating component, such as a heating plate, thereby controlling the water temperature in the housing assembly 5100, such as the inner container 5110, to be maintained within a preset temperature range. Thus, it is ensured that the water temperature in the inner container 5110 is always maintained at 62° C.-68° C. during a washing process of the washing main body 5000, thereby improving a cleaning effect and protecting the inner container 5110 from high-temperature damage.

In one embodiment, the temperature compensation component 5800 comprises an NTC (Negative Temperature Coefficient thermistor).

In one optional embodiment, a container washing machine comprises a washing main body and a filtering device. The washing main body comprises a housing assembly, a washing device, a water inlet driving device, a drainage driving device, and at least one rack disposed in the housing assembly. For the washing main body, reference may be made to the washing main body 5000, and details are not repeatedly described herein. The filtering device is configured to filter calcium and magnesium ions in water. The filtering device is disposed outside the washing main body and is connected to the water inlet driving device through a connecting assembly. A connecting portion between the filtering device and the water inlet driving device is disposed at an upper portion of the filtering device or above the filtering device. For example, the connecting portion between the filtering device 6000 of the container washing machine 10*d* and the water inlet driving device 5200 is disposed at the upper portion of or above the filtering device 6000. The water inlet driving device is configured to convey water filtered by the filtering device into the washing main body. The washing device is configured to wash containers placed on the at least one rack by using the water filtered by the filtering device. The drainage driving device is configured to discharge used water in the washing main body out of the washing main body.

In one optional embodiment, the filtering device comprises at least one water tank. For instance, the container washing machine 10*d* comprises a first water tank 6100. The connecting portion between the filtering device (such as the filtering device 6000) of the container washing machine (such as the container washing machine 10*d*) and the water inlet driving device (such as the water inlet driving device 5200) is disposed at the upper portion of the filtering device. That is, the connecting portion between the filtering device of the container washing machine and the water inlet driving device is disposed at the upper portion of the first water tank (that is, at a position away from a bottom portion of the first water tank). Furthermore, a groove structure or a hole structure is defined on the first water tank for mounting the connecting portion between the filtering device of the container washing machine having the external water tank and the water inlet driving device. Alternatively, the connecting portion between the filtering device of the container washing machine and the water inlet driving device is disposed above the filtering device. That is, the connecting portion between the filtering device of the container washing machine and the water inlet driving device is disposed above the first water tank (that is, at a position above a top portion of the first water tank). For example, the connecting portion between the filtering device of the container washing machine and the water inlet driving device is directly disposed at top ends of side walls of the first water tank.

Optionally, the filtering device of the container washing machine is directly mounted to a water outlet of a faucet, and the filtering device is capable of directly conveying filtered water into the washing main body.

In one optional embodiment, a container washing machine having an external water tank, such as the container washing machine 10*d*, comprises a washing main body (such as the washing main body 5000), a water tank (such as the first water tank 6100), and a delivery pipe (such as the delivery pipe 6710). The water tank is disposed outside the washing main body and is configured to store washing liquid. The water tank is connected to a water inlet driving device (such as the water inlet driving device 5200) through the delivery pipe, and a water outlet portion of the delivery pipe is disposed at an upper portion of the water tank or above the water tank. The water outlet portion of the delivery pipe is understood as a position where the delivery pipe is connected to the water inlet driving device through a coordination of a connector and a hose, or a position where it is directly connected through a hose. The term "above the water tank" may be understood as a position above top ends of side walls of the water tank. The term "the upper portion of the water tank" may be understood as a position below the top ends of the side walls of the water tank and away from a bottom portion of the water tank. In one case, a filtering component, such as the filtering component (6300*d*1, 6300*d*2, 6300*d*3, 6300*d*4), is disposed in the water tank (such as the first water tank 6100) to filter calcium ions and magnesium ions in water. The filtering component is directly fixed to the water tank. For instance, at least one fixing structure is disposed in the water tank to fix the filtering component, and water filtered by the filtering component is directly stored in the water tank.

In another case, the filtering component, such as the filtering component (6300*d*1, 6300*d*2, 6300*d*3, 6300*d*4), is disposed outside the water tank (such as the first water tank 6100). The filtering component is disposed above the water tank, and the water filtered by the filtering component is output into the water tank. In yet another case, the water tank, such as the first water tank 6100, is configured to store water directly.

What is claimed is:

1. A filtering device, comprising:

a first water tank;

a second water tank;

a filtering component;

a delivery pipe; and a connector;

wherein the delivery pipe is connected to and communicated with the connector, the first water tank is detachably connected to the second water tank, and at least a portion of the second water tank is disposed within the first water tank;

wherein the filtering component is connected to at least one of the first water tank and the second water tank, the filtering component is configured to filter calcium and magnesium ions in water from the second water tank and is configured to convey filtered water into the first water tank;

wherein at least a portion of the delivery pipe is disposed within the first water tank, and at least a portion of the connector is disposed outside the first water tank;

wherein the first water tank comprises a bottom wall and side walls, the side walls are connected around the bottom wall to define a water tank cavity and a water inlet, and the water tank cavity is communicated with the water inlet;

wherein the connector is disposed in a position of the first water tank that is away from the bottom wall of the first water tank and close to the water inlet of the first water tank.

2. The filtering device according to claim 1, wherein a first clamping groove is defined on an outer surface of the connector, a first engaging structure is disposed on top ends of the side walls of the first water tank away from the bottom wall of the first water tank, and the first engaging structure is disposed in the first clamping groove.

3. The filtering device according to claim 2, wherein a second clamping groove is disposed on the outer surface of the connector, the filtering device further comprises a top cover, the top cover is configured to be disposed on the side walls of the first water tank to cover the water inlet of the first water tank, the top cover comprises a second engaging structure, and the second engaging structure is disposed in the second clamping groove.

4. The filtering device according to claim 1, wherein the delivery pipe is disposed in the water tank cavity of the first water tank and is close to an inner surface of the side walls of the first water tank, and the delivery pipe is disposed between the side walls of the first water tank and an outer surface of the second water tank;

wherein one end of the delivery pipe away from the connector is disposed close to the bottom wall of the first water tank, and the connector is disposed at one end of the side walls of the first water tank away from the bottom wall of the first water tank.

5. The filtering device according to claim 1, wherein the second water tank is detachably connected to the filtering component, and a connection method of the second water tank and the filtering component comprises any one of following:

(1) a first connecting structure is disposed on one end of the filtering component, the second water tank comprises a bottom wall and side walls connected to a periphery of the bottom wall, the second water tank further comprises a second connecting structure disposed on an outer surface of the bottom wall of the second water tank, and the first connecting structure is detachably connected to the second connecting structure;

(2) the second water tank comprises the bottom wall, a tank wall, and the side walls connected to the periphery of the bottom wall of the second water tank, the tank wall is connected to the bottom wall of the second water tank, and the tank wall is disposed below the bottom wall of the second water tank, the side walls of the second water tank are connected around the bottom wall of the second water tank to define a water tank cavity, the tank wall defines a mounting groove, the mounting groove is communicated with the water tank cavity of the second water tank, the mounting groove is configured to mount the filtering component, and the filtering component is capable of being mounted in the mounting groove and being taken out from the mounting groove;

(3) the second water tank comprises the bottom wall, the side walls connected to the periphery of the bottom wall of the second water tank, and a reinforcing wall, the reinforcing wall is connected to the bottom wall of the second water tank, and the reinforcing wall is disposed below the bottom wall and the side walls of the second water tank, a portion of the filtering component is disposed on the bottom wall of the second water tank, and the portion of the filtering component is surrounded by the reinforcing wall.

6. The filtering device according to claim 5, wherein the first connecting structure comprises a first thread, the second connecting structure comprises a second thread, and the first thread is threadedly connected to the second thread.

7. The filtering device according to claim 6, wherein a connecting wall extending upward is disposed on an edge of a first end surface of the filtering component, and the first thread is disposed on an inner surface of a connecting wall of the filtering component;

wherein a connecting end extending downward is disposed on the outer surface of the bottom wall of the second water tank, and the second thread is disposed on an outer surface of a connecting end of the second water tank.

8. The filtering device according to claim 5, wherein a positioning column extending upward is disposed on an inner surface of a bottom portion of the tank wall; a positioning groove recessed upward is disposed on a second end surface of the filtering component, the positioning groove is configured to accommodate the positioning column, and the positioning column is disposed in the positioning groove to position the filtering component;

wherein a water hole of the second water tank penetrates through the bottom portion of the tank wall and the positioning column;

wherein the filtering component comprises water inlet holes and a water outlet hole communicated with the water inlet holes, and the water outlet hole is communicated with the positioning groove and the water hole of the second water tank.

9. The filtering device according to claim 8, wherein a diameter of the water hole of the second water tank is greater than a diameter of the water outlet hole of the filtering component.

10. The filtering device according to claim 5, wherein the portion of the filtering component passes through the bottom wall and the reinforcing wall of the second water tank and is disposed below the second water tank.

11. The filtering device according to claim 10, wherein the filtering device further comprises a sealing ring, and the sealing ring is disposed between the filtering component and the second water tank.

12. The filtering device according to claim 11, wherein the sealing ring comprises a first sealing portion and a second sealing portion connected to the first sealing portion;

wherein a sealing groove is defined on the filtering component, and the first sealing portion is disposed in the sealing groove;

wherein the second sealing portion is disposed on the bottom wall of the second water tank.

13. The filtering device according to claim 1, wherein the filtering component comprises a first end surface and a second end surface disposed opposite to the first end surface, and the filtering component further comprises water inlet holes disposed on the first end surface thereof and a water outlet hole disposed on the second end surface thereof;

wherein an area of the first end surface of the filtering component is greater than an area of the second end surface of the filtering component.

14. The filtering device according to claim 1, wherein a diameter of the filtering component gradually decreases from the first end surface toward the second end surface.

15. The filtering device according to claim 1, wherein a capacity of the second water tank is less than a capacity of the first water tank.

16. A container washing machine, comprising:

a washing main body; and the filtering device according to claim 1;

wherein the washing main body comprises a housing assembly, a washing device, a water inlet driving device, a drainage driving device, and at least one rack disposed in the housing assembly, and the at least one rack is configured to hold containers;

wherein the first water tank, the second water tank, and the filtering component of the filtering device are disposed outside the washing main body, and the connector of the delivery pipe is detachably connected to the water inlet driving device through a connecting assembly;

wherein the water inlet driving device is configured to drive water in the first water tank into the washing main body;

wherein the washing device is configured to wash the containers placed on the at least one rack by using water from the first water tank;

wherein the drainage driving device is configured to discharge used water in the washing main body out of the washing main body.

* * * * *